US010824662B2

(12) United States Patent
Martin et al.

(10) Patent No.: US 10,824,662 B2
(45) Date of Patent: Nov. 3, 2020

(54) METHODS AND SYSTEM FOR ITERATIVELY ALIGNING DATA SOURCES

(71) Applicant: Nuance Communications, Inc., Burlington, MA (US)

(72) Inventors: David L. Martin, Santa Clara, CA (US); Peter Zei-Chan Yeh, Milpitas, CA (US); Peter Frederick Patel-Schneider, Sunnyvale, CA (US); Jan Noessner, Tamarama (AU)

(73) Assignee: Nuance Communications, Inc., Burlington, MA (US)

( * ) Notice: Subject to any disclaimer, the term of this patent is extended or adjusted under 35 U.S.C. 154(b) by 635 days.

(21) Appl. No.: 14/881,469

(22) Filed: Oct. 13, 2015

(65) Prior Publication Data
US 2017/0103131 A1    Apr. 13, 2017

(51) Int. Cl.
*G06F 7/00* (2006.01)
*G06F 16/36* (2019.01)
*G06F 16/903* (2019.01)
*G06F 16/23* (2019.01)

(52) U.S. Cl.
CPC ........ *G06F 16/367* (2019.01); *G06F 16/2365* (2019.01); *G06F 16/90344* (2019.01)

(58) Field of Classification Search
CPC ......... G06F 17/30985; G06F 17/30371; G06F 16/90344; G06F 16/2365; G06F 16/367
See application file for complete search history.

(56) References Cited

U.S. PATENT DOCUMENTS

| | | | | |
|---|---|---|---|---|
| 2005/0273452 | A1* | 12/2005 | Molloy | ............... G06F 16/284 707/999.001 |
| 2008/0301154 | A1* | 12/2008 | Vithayathil | ............. G06F 16/20 707/999.1 |
| 2010/0070460 | A1* | 3/2010 | Furst | ...................... G06N 5/04 707/602 |
| 2014/0222793 | A1* | 8/2014 | Sadkin | ............... G06F 17/3053 707/723 |

OTHER PUBLICATIONS

Noessner et al., CogMap: A Cognitive Support Approach to Property and Instance Alignment. The Semantic Web—ISWC 2015. 2015;9366:1-15.

* cited by examiner

*Primary Examiner* — Kannan Shanmugasundaram
(74) *Attorney, Agent, or Firm* — Wolf, Greenfield & Sacks, P.C.

(57) ABSTRACT

According to some aspects, a method for aligning a first data source and a second data source during a plurality of iterations comprising a current iteration and a previous iteration is provided. The method comprises generating at least one property alignment hypothesis between at least one first property of the first data source and at least one second property of the second data source; generating a plurality of instance alignment hypotheses between a respective first plurality of instances of the first data source and a respective second plurality of instances of the second data source; and verifying at least one property alignment hypothesis and/or at least one of the plurality of instance alignment hypotheses. Generating the at least one property alignment hypothesis and/or generating the plurality of instance alignment hypotheses is based, at least in part, on at least one property alignment hypothesis and/or at least one instance alignment hypothesis verified during the previous iteration.

20 Claims, 36 Drawing Sheets

| Person | | |
|---|---|---|
| Id | First Name | Last Name |
| Jan Noessner | Jan | Noessner |
| Martin David | Martin | David |
| Peter Patel-Schneider | Peter | Patel-Schneider |

Data Source A

| People | | |
|---|---|---|
| Prename | Surname | Full Name |
| Jan | Noessner | Jan Noessner |
| Peter | Yeh | Peter Yeh |

Data Source B

FIG. 9

- Initial Property Matching
  First Name ↔ Prename   0.65
  Last Name ↔ SurName    0.33
- Instance Alignment based on Property Matching
- Property Matching
  Last Name ↔ Surname    0.5
- Refined Instance Alignment

*i=0*

*i=1*

| | Data Extraction | | | Data Exploration | | |
|---|---|---|---|---|---|---|
| | $dp_1$ | ... | $dp_n$ | $op_a$ ... $dp_{1,a}$ ... $dp_{n,a}$ | ... | $op_b$ ... ... ... |
| $i_1$ | $v_{1,1}$ | ... | $v_{1,n}$ | $v_{1,1,a}$ ... $v_{1,n,a}$ | ... | |
| ⋮ | ⋮ | ⋱ | ⋮ | ⋮ ⋱ ⋮ | | |
| $i_m$ | $v_{m,1}$ | ... | $v_{m,n}$ | $v_{m,1,a}$ ... $v_{m,n,a}$ | ... | |

FIG. 17

— Data Extraction:

| ?a | ?b | ?c |
|---|---|---|
| i1 | name | Memento |
| i2 | name | Inception |

— Data Expansion:

| ?b | ?c | ?d | ?e |
|---|---|---|---|
| directedBy | i3 | name | Christopher Nolan | transform to

| | name | directedBy |
| | | name |
|---|---|---|
| Memento | Christopher Nolan |
| Inception | null |

FIG. 19

Aggregators

Unions or joins of sets of correspondences. Average, maximum, or multiples of confidence values if correspondences share the same source entity $e_s$ and target entity $e_t$.

Filters

| Name | Description |
|---|---|
| TopKFilter | Returns the top-$k$ correspondences with the highest confidence value $c$. |
| OneToOneFilter | Returns a functional one-to-one alignment. We implemented a greedy strategy. First, it orders the correspondences in descending order. Then, it traverses through the list and drops all correspondences whose entities $e_s$ or $e_t$ have been already matched. |

Property Matchers

| Name | Description |
|---|---|
| PropertyNameMatcher | Matches properties according to their name. |
| ValueLengthMatcher | Matches properties $p_1$ and $p_2$ with close average value length / close percentages of distinct row entries $l_1$ and $l_2$. The similarity is computed with $Min(l_1, l_2)/(Max(l_1, l_2))$. |
| DistinctValueMatcher | |
| InstanceBasedMatcher | If instance alignments $\mathcal{Y} = \emptyset$, we align properties by concatenating all values of all instances for each property and compute the string similarity. If $\mathcal{Y} \neq \emptyset$, we compute the property similarities for every instance pair in $\mathcal{Y}$ separately and average over the results. |

Instance Matchers

Align instances by concatenating every value for every property and computing their string similarity. If a specific property $p$ is given, consider only values of that property. If an instance alignment $\mathcal{Y}$ is given, traverse through that alignment and update the similarities based on the string values of all the given property value(s).

FIG. 23

– ValueLengthMatcher
– May match properties $p_1$ and $p_2$ with close average value length $l_1$ and $l_2$. The similarity may be computed with $\frac{\min(l_1, l_2)}{\max(l_1, l_2)}$.

– InstanceBasedMatcher
  – If instance alignments $Y = \emptyset$, properties may be aligned by concatenating all values of all instances for each property and computing the string similarity. If $Y \neq \emptyset$, the property similarities may be computed for every instance pair in $Y$ separately and averaged over the results.

| Person |
|---|
| Id |
| Jan Noessner |
| Peter Yeh |
| Peter Patel-Schneider |

| People |
|---|
| Full Name |
| Jan Noessner |
| Peter Yeh | sim(
"Jan Noessner Peter Yeh Peter Patel-Schneider",
"Jan Noessner Peter Yeh"
) = 0.7

FIG. 27

OneToOneFilter

- May return a functional one-to-one alignment. A greedy strategy may be used. First, the filter may order the correspondences in descending order. Then, the filter may traverse through the list and drop all correspondences whose entities $e_s$ or $e_t$ have been already matched.

| | | | |
|---|---|---|---|
| Id | ⟷ name | 1.0 | ✓ |
| Prename | ⟷ name | 0.9 | ✗ |
| Prename | ⟷ first_name | 0.8 | ✓ |

FIG. 29

– Normalized (logarithmic) Discounted Cumulative Gain

– Precision

– @n (metrics are only evaluated on the top-n results)

$$nDCG = \frac{rel_1 + \sum_{i=2}^{n} \frac{rel_i}{log_2 i}}{(1 + \sum_{i=2}^{n} \frac{1}{log_2 i})}$$

$$P = \frac{|\text{correct correspondences}|}{|\text{retrieved correspondences}|}$$

✓

✓

✗

$$nDCG@3 = \frac{1 + \frac{1}{log\,2} + \frac{0}{log\,3}}{1 + \frac{1}{log\,2} + \frac{1}{log\,3}} = 0.76$$

$$P@3 = \frac{2}{3} = 0.67$$

FIG. 31

Benchmark (1)

|  | Baseline | INSTMAP | COGMAP |
|---|---|---|---|
| nDCG@3 | 0.38 | 0.76 | 1.00 |
| nDCG@6 | 0.35 | 0.74 | 0.89 |
| P@3 | 0.33 | 0.67 | 1.00 |
| P@6 | 0.33 | 0.67 | 0.83 |
| Runtime in sec | 0.4 | 1.9 | 3.0 |

Benchmark (2)

|  | Baseline | INSTMAP | COGMAP |
|---|---|---|---|
| nDCG@3 | 0.38 | 1.00 | 1.00 |
| nDCG@6 | 0.25 | 0.90 | 1.00 |
| nDCG@9 | 0.20 | 0.79 | 1.00 |
| nDCG@12 | 0.17 | 0.69 | 0.85 |
| P@3 | 0.33 | 1.00 | 1.00 |
| P@6 | 0.17 | 0.83 | 1.00 |
| P@9 | 0.11 | 0.67 | 1.00 |
| P@12 | 0.08 | 0.50 | 0.75 |
| Runtime in sec | 2.6 | 20.5 | 29.1 |

FIG. 32

METHODS AND SYSTEM FOR ITERATIVELY ALIGNING DATA SOURCES

BACKGROUND

In recent years, companies have significantly increased efforts in building knowledge graphs based on ontologies that incorporate data from multiple heterogeneous data sources (also referred to herein as "information stores"). To utilize the information in multiple data sources, it is frequently necessary to combine or "align" the data to identify which data in each data source refers to the same information. However, alignment is a relatively complex and time consuming process. Data sources may be enormous, may be created independently, and may have different schemas of organization (e.g., data sources may be organized as hierarchical, relational or object oriented databases, or may be represented in a document format such as XML). Moreover, information stored in different data sources is often stored in different, inconsistent, and sometimes unintuitive ways. For example, a movie database may include details in a title property that are not actually part of the title (such as Casablanca (Colorized)). Moreover, some data sources may represent data, such as dates, in strings, while others may use numerical values, while still others may represent the same data using a combination of string and numerical representations.

Furthermore, the manner in which similar properties are represented often varies between given data sources. Take, for example, the simple case of two data sources A and B that store, among other information, names of individuals (e.g., patients, members, contacts, etc.), but do so using different schema (e.g., with differently labeled properties) than the data in data source B. Data source A, for example, includes properties labeled "Id," "First Name," and "Last Name," while data source B includes properties labeled "Prename," "Surname," and "Full Name." How these different schema align (if at all) may not be trivial to determine. Moreover, the data values of a single property may not be sufficient to determine the best alignment between the data sources. As a result, alignment of two data sources is often a complex and time intensive process, consuming relatively significant resources.

SUMMARY

Some embodiments include a system for aligning a first data source and a second data source during a plurality of iterations comprising a current iteration and a previous iteration. The system may comprise at least one processor, which may be configured to perform during the current iteration: generating at least one property alignment hypothesis between at least one first property of the first data source and at least one second property of the second data source; generating a plurality of instance alignment hypotheses between a respective first plurality of instances of the first data source and a respective second plurality of instances of the second data source; and verifying at least one property alignment hypothesis and/or at least one of the plurality of instance alignment hypotheses. Generating the at least one property alignment hypothesis and/or generating the plurality of instance alignment hypotheses may be based, at least in part, on at least one property alignment hypothesis and/or at least one instance alignment hypothesis verified during the previous iteration.

Some embodiments include a method for aligning a first data source and a second data source during a plurality of iterations comprising a current iteration and a previous iteration. The method may comprise: generating at least one property alignment hypothesis between at least one first property of the first data source and at least one second property of the second data source; generating a plurality of instance alignment hypotheses between a respective first plurality of instances of the first data source and a respective second plurality of instances of the second data source; and verifying the at least one property alignment hypothesis and/or at least one of the plurality of instance alignment hypotheses. Generating the at least one property alignment hypothesis and/or generating the plurality of instance alignment hypotheses may be based, at least in part, on at least one property alignment hypothesis and/or at least one instance alignment hypothesis verified during the previous iteration.

Some embodiments include a computer-readable storage medium having instructions that, when executed by at least one processor, perform a method for aligning a first data source and a second data source during a plurality of iterations comprising a current iteration and a previous iteration. The method may comprise: generating at least one property alignment hypothesis between at least one first property of the first data source and at least one second property of the second data source; generating a plurality of instance alignment hypotheses between a respective first plurality of instances of the first data source and a respective second plurality of instances of the second data source; and verifying the at least one property alignment hypothesis and/or at least one of the plurality of instance alignment hypotheses. Generating the at least one property alignment hypothesis and/or generating the plurality of instance alignment hypotheses may be based, at least in part, on at least one property alignment hypothesis and/or at least one instance alignment hypothesis verified during the previous iteration.

BRIEF DESCRIPTION OF THE DRAWINGS

Various aspects and embodiments of the application will be described with reference to the following figures.

FIG. 9 is a diagram illustrating two data sources with different schema and instance assertions provided, in accordance with some embodiments;

FIG. 17 is a table illustrating a general form of a source and target table, in accordance with some embodiments;

FIG. 19 is an illustration of exemplary transformations of an alignment system using RDF knowledge bases, in accordance with some embodiments;

FIG. 23 is a table illustrating a selection of implemented components of an alignment system, in accordance with some embodiments;

FIG. 27 is an illustration of an instance based matcher of an alignment system, in accordance with some embodiments;

FIG. 29 is an illustration of a one-to-one filter of an alignment system, in accordance with some embodiments;

FIG. 31 is an illustration of exemplary metrics used to evaluate an alignment system, in accordance with some embodiments;

FIG. 32 is an illustration of results for benchmarks used to evaluate an alignment system, in accordance with some embodiments;

DETAILED DESCRIPTION

Figure 1:
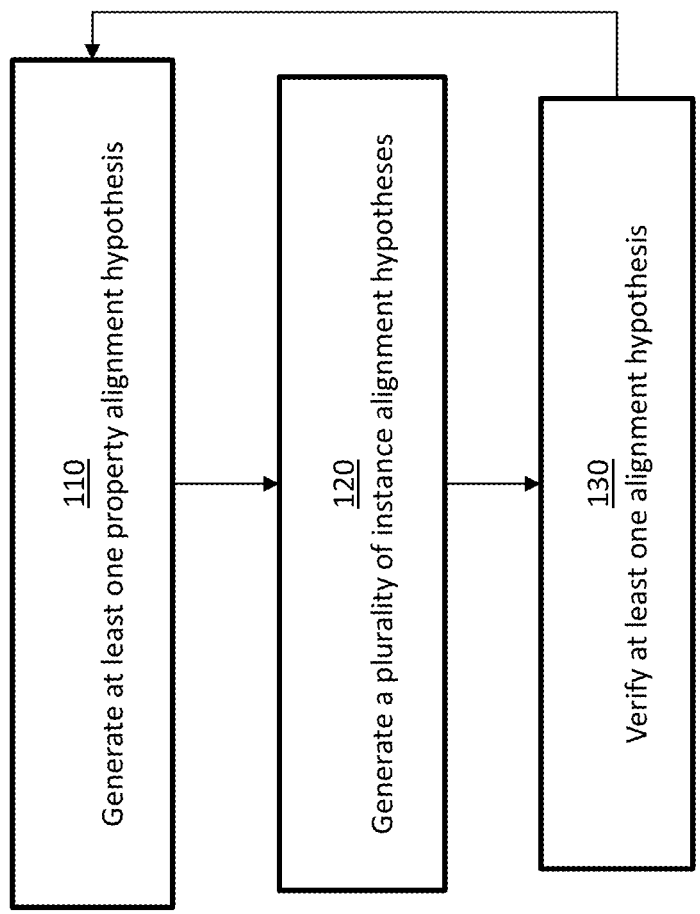
FIG. 1 is a flow chart illustrating an exemplary method for aligning a first data source and a second data source, in accordance with some embodiments.

As discussed above, aligning two data sources is often a complex, time, and cost intensive process. Conventional techniques for aligning two data sources typically rely on extensive manual effort from a knowledge engineer, domain expert, or other human operator to determine the best alignment of the schema to combine the data sources, thus involving substantial time and expense. For example, a human participant typically must view, parse, and analyze very large amounts of information, often represented in cognitively difficult ways, to evaluate how the data aligns. Such conventional techniques are time and cost intensive, and in some cases are prohibitive, and therefore have limited applicability.

Some conventional alignment systems have attempted to address drawbacks associated with manual alignment by automating the process of aligning data sources. However, these conventional techniques typically do so by solving a single integration problem (e.g., by deriving a mapping between two ontologies) using a fully-automated, "one-shot" approach. In this "one shot" approach, two data sources are provided as an input and are automatically analyzed to determine a mapping between the data sources without input or correction made during the analysis. However, such conventional automated algorithms are often error prone and frequently cannot be used for high-quality data integration without further costly correction by a human operator. Moreover, the complexity of identifying an alignment of large data sources in a single shot is computationally intensive, often resulting in long computation times (e.g., on the order of days).

The inventors have developed an iterative approach to aligning data sources that may address one or more of the drawbacks of conventional techniques. According to some embodiments, on each of multiple iterations of an alignment process, a number of alignment hypotheses are generated and verified, wherein generating at least some of the alignment hypotheses is based, at least in part, on alignment hypotheses that were verified during a previous iteration. In this manner, alignment hypotheses can be improved on each iteration by using information from previous iterations, thus improving the resulting alignment. By using an iterative approach where alignment hypotheses are generated based on information from one or more previous iterations, the accuracy of the alignment can be improved. Furthermore, an iterative approach can reduce the computational complexity of one-shot approaches that attempt to align all of the data simultaneously.

According to some embodiments, automated techniques are combined with human involvement. For example, on each iteration (or a select number of iterations) of an alignment process to align two data sources, alignment hypotheses may be automatically generated and presented to a human operator for verification. The human operator may examine the alignment hypotheses and verify one or more alignment hypotheses and/or reject one or more alignment hypotheses. On the next iteration, the alignment hypotheses verified and/or rejected by the human operator can be utilized to generate further alignment hypotheses to be presented to the human operator. This combined technique may significantly reduce the effort on the part of the human operator.

For example, the human operator need not analyze voluminous amounts of data represented in various, and sometime unintuitive, ways to assess how the data should be aligned. Instead, the alignment system automatically generates a relatively small number of alignment hypotheses and presents the hypotheses to the user in a straightforward manner so that the user can quickly indicate which alignment hypotheses are proper and/or which alignment hypotheses are not (e.g., the alignment hypotheses may be presented on a user interface that allows the human operator to select proper alignment hypotheses and/or otherwise indicate which alignment hypotheses are proper and/or which are not). The selections or indications by the human operator can be used to guide the automated generation of further alignment hypotheses. Using this iterative approach, alignment hypotheses can be generated and verified in manageable portions to facilitate efficient alignment of the two data sources.

According to some embodiments, a human operator is not utilized. For example, alignment hypotheses automatically generated on each iteration can be automatically analyzed to verify one or more correct alignment hypotheses and/or reject one or more incorrect alignment hypotheses. The automatically verified and/or rejected alignment hypotheses may be used to guide automatic generation of further alignment hypotheses on the next iteration. In this manner, an iterative approach can be substantially or entirely automated. According to some embodiments, an iterative approach may be utilized wherein some iterations involve human participation and some iterations may be fully automated (e.g., a first iteration or optionally a number of further iterations may involve human participation while the remainder of iterations are performed automatically). The iterative approach developed by the inventors facilitates a more efficient and effective manner of aligning data sources that may reduce cost, time and/or errors in the alignment process.

The inventors have further recognized that conventional techniques may focus, or rely entirely on, alignment of properties (relational databases) or classes (object-oriented databases) to align two data sources. However, the inventors have appreciated that the performance of aligning data sources can be improved by aligning instances or otherwise utilizing instance information. According to some embodiments, using the iterative approach developed by the inventors, alignment hypotheses generated on each iteration comprise at least one property alignment hypothesis and at least one instance hypothesis, wherein one or more of the alignment hypotheses on each iteration is generated based, at least in part, on a property alignment hypothesis and/or an instance alignment hypothesis verified and/or rejected during one or more previous iterations.

As used herein, an instance is a specific entity mentioned in an information store. An instance can be primitive, such as the string "Jan Noessner," the number 15, or the year 2011, or complex, such as the entity Jan Noessner, a person which itself has multiple properties. A property refers to a category or class of information, to which a schema assigns a label. A value of a property refers to a specific realization of the corresponding property; that is, to the instance indicated by a specific occurrence of the property. For example, referring to the small portion of a data source A illustrated in FIG. 9, "Id," "First Name," and "Last Name" are properties, and in data source B, "Prename," "Surname," and "Full Name" are properties. "Jan Noessner," "Martin David," and "Peter Patel-Schneider" are values of the property labeled "Id," in the illustrated portion of data source A, and "Jan Noessner" and "Peter Yeh" are values of the property labeled "Full Name," in the illustrated portion of data source B. In a movie database such as Fandango, the database may include a property labeled "Title" with values of "Casablanca," "Gone with the Wind," and "The Godfather," etc. This same database may have a property labeled "Director" with values of "Michael Curtiz," "Victor Fleming," and "Francis Ford Coppola," corresponding to the respective title instances listed above (e.g., in the same record or row). All of the illustrative values mentioned in this paragraph, such as the string "Jan Noessner," are primitive instances. However, the values of a property are not limited to primitive instances; they can just as well be complex instances, which themselves have multiple properties. The value of a property is also referred to herein as the instance of a property.

Utilizing instance information may improve the alignment, for example, by using instance information to inform property alignment. Additionally, a proposed instance alignment may give rise to a number of consequences that can be evaluated to ascertain whether the proposed instance alignment is correct. For example, using the example of aligning two databases storing movie information, a first database may have stored under the title property the instance "Casablanca (Color)" while a second database stores under the title property the instance "Casablanca." While the instances do not perfectly match, the consequence of aligning these two titles may result in aligning "Francis Ford Coppola" as an instance under the director property of both databases. In this example, the consequence of aligning "Casablanca (Color)" with "Casablanca" results in a perfect matching for the respective instances under the director property, thus reinforcing that the proposed instance alignment is correct. On the other hand, an alignment hypothesis may match the title "Crash" (the 1996 film) in the first database with the title "Crash" (the 2004 film) in the second database. The consequence of this particular alignment is that the director "David Cronenberg" in the first database is thereby aligned with the director "Paul Haggis" in the second database. Even though the titles form a perfect match, the consequences can be used to reject this proposed alignment as an incorrect match between the 1996 movie titled "Crash" and the 2004 movie of the same name. Thus, the consequences of a proposed alignment hypothesis can be used to facilitate verification or rejection of the proposed alignment hypothesis.

Aspects of the iterative approach developed by the inventors are cognitively-inspired, facilitating improved accuracy of an alignment system. With increasing iterations, the alignment process improves the accuracy of the alignment hypotheses that are generated, since the iterative alignment process may build on the results of previous iterations (or, in the case of the first iteration, seed queries that may be automatically generated or provided by a user). At each iteration, the system may augment the results with new information that has been verified automatically or by a human participant.

According to some embodiments, the system may explore the search space of instances by not only focusing on data properties but also taking object properties into account. An object property (of a complex instance i1) refers herein to a property of a different complex instance i3, which itself is indicated as the value of a property of instance i1. For example, in FIG. 18 the instance i1, representing the film "Memento," refers via its "directedBy" property to instance i3, representing a person named "Christopher Nolan". In this example, the "name" property of instance i3 is an object property of instance it (the term "object property" is used because there is a 2-step path from i1, through the instance (or "object") i3, to get to the value of the property). In the case of relational databases, the system may follow foreign keys as object properties; with XML information stores, the system may explore sub-elements as object properties.

Following below are more detailed descriptions of various concepts related to, and embodiments of, methods and apparatus for aligning data sources. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates an iterative method for aligning a first data source and a second data source, in accordance with some embodiments. The data sources to be aligned may be of any type including, but not limited to, hierarchical databases, relational databases, object oriented databases, semi-structured data sources like Extensible Markup Language (XML) and JavaScript Object Notation (JSON) files, tuple-based data sources like Resource Description Framework (RDF) files or triple stores, ontology-based sources, etc. The data sources may be of the same type or of different types, as the techniques described herein are not limited for use with any particular type or combination of types of data sources.

In act 110, at least one property alignment hypothesis is generated on the current iteration of the process. For example, a hypothesis that at least one first property of a first data source matches at least one respective second property of a second data source may be generated. Each property hypothesis is a proposition that the corresponding properties refer to the same type of information. For example, the system may generate the hypothesis that the data property labeled "First Name" in data source A and the data property labeled "Prename" in data source B (as shown in FIG. 9) correspond to each other and should be aligned. Any number of property alignment hypotheses may be generated on each iteration. As discussed in further detail below, in embodiments where a human participates in verifying alignment hypotheses, it may be advantageous to limit the number of hypotheses generated such that the presentation of alignment hypotheses is easily understood and digestible by the human viewer.

In act 120, a plurality of instance alignment hypotheses are generated on the current iteration. For example, hypotheses that a respective first plurality of instances of the first data source should be matched with a respective second plurality of instances of the second data source may be generated. As with the property alignment hypotheses, any number of instance alignment hypotheses can be generated, but it may be preferable to select a number suitable for relatively quick and easy consumption in embodiments where a human participates in verifying the alignment hypotheses.

Some instance alignment hypotheses may be the consequence of one or more property alignment hypotheses. For example, suppose that a property alignment hypothesis asserts that the "Id" property in data source A should be aligned with the property labeled "Full Name" in data source B. The consequence of this alignment is that the instances in these properties should also match, lending to the generation of the instance alignment hypothesis asserting that the instance "Jan Noessner" of the "Id" property in data source A aligns with the instance "Jan Noessner" of the "Full Name" property in data source B (as shown in FIG. 9).

Furthermore, some instance alignment hypotheses may be the consequence of one or more other instance alignment hypotheses. For example, the consequence of the instance alignment hypothesis that the instance "Jan Noessner" of the "Id" property in data source A aligns with the instance of "Jan Noessner" of the "Full Name" property in data source B is that other instances in the same row or record must also align. For example, the instance "Jan" of the property labeled "First Name" in data source A should align with some instance in the same row or record containing the instance "Jan Noessner" in data source B, leading to an instance alignment hypothesis that the instance "Jan" of the property labeled "First Name" should align with the instance "Jan" of the "Prename" property in data sources A and B, respectively. Referring back to the movie example described above, the instance alignment hypothesis that a given instance of "Crash" (1996) in a first data base aligns with a given instance of "Crash" (2004) in a second data base has the consequence of aligning theatrical release dates of 1996 and 2004, respectively, which can be used to reject this particular alignment of the instances of "Crash," despite how well matched the titles are.

Additionally, some property alignment hypotheses may be consequences of one or more instance alignment hypotheses. For example, the consequence of the instance alignment hypothesis of the instances of "Jan" (which may be a consequence of aligning the instances of "Jan Noessner") is the alignment of the "First Name" property in data source A with the "Prename" property in data source B. Thus, the consequences of alignment hypotheses can be used to generate further alignment hypotheses, may be used to assign a confidence to one or more alignment hypotheses, and/or may be used to facilitate verification and/or rejection of one or more alignment hypotheses, as discussed in further detail below.

As discussed above, generation of one or more alignment hypotheses (e.g., property or instance alignment hypotheses) may be based on alignment hypotheses that were verified and/or rejected on previous iteration(s). In this way, knowledge can be built up over a number of iterations to improve the generation of alignment hypotheses, for example, by suggesting alignment hypotheses that flow from verified alignment hypotheses or by excluding alignment hypotheses that flow from rejected alignment hypotheses. For example, the consequences of verified and/or rejected alignment hypotheses (either property or instance alignment hypotheses) may be used to guide the generation of further alignment hypotheses in a current iteration of the alignment process. Using verified and/or rejected alignment hypotheses from previous iterations can constrain the search space of possible property and instance alignment hypotheses, and can both guide the generation of and facilitate assigning confidence values to alignment hypotheses generated during the current iteration.

In act 130, one or more of the alignment hypotheses generated during the current iteration is verified and/or rejected. For example, at least one property alignment hypothesis and/or at least one instance alignment hypothesis may be verified as a correct match and/or at least one property alignment hypothesis and/or at least one instance alignment hypothesis may be rejected as an incorrect match. The verified and/or rejected hypotheses may then be provided to facilitate generating further alignment hypotheses on a next iteration, as indicated by the arrow from act 130 to act 110 in FIG. 1.

Act 130 may be performed automatically, may be performed with assistance from a human participant, or a combination of both. For example, according to some embodiments, alignment hypotheses generated in acts 110 and 120 are presented via a user interface to a human participant for verification and/or rejection (e.g., see act 135 in FIG. 2). The user interface may present the alignment hypotheses in a manner that allows the user to efficiently evaluate whether the alignment hypotheses are correct or not and may provide a mechanism that allows the user to indicate whether a corresponding alignment hypothesis is accurate or not. For example, the user interface may present each property alignment hypothesis along with any instance alignment hypotheses that flow as a consequence from the corresponding property alignment hypotheses. Presenting an alignment hypothesis along with its consequences may facilitate easier analysis by the human participant (or may improve automated verification). However, the alignment hypotheses can be organized in other ways, for example, with property alignment hypotheses presented together and instance alignment hypotheses presented together, or in any other suitable manner.

To assist in automated verification and/or to further assist a human participant in embodiments that utilize human involvement, the one or more property alignment hypotheses and consequential instance alignment hypotheses may be ranked in order of a confidence value assigned to the alignment hypotheses. For example, during generation, each alignment hypothesis may be assigned a confidence value based on any available information including, but not limited to, how closely the property and/or instance matches the proposed alignment target, either syntactically and/or semantically, based on information from previous iterations (e.g., verifications and/or rejections of alignment hypotheses from one or more previous iterations), by evaluating consequences of the alignment hypotheses and/or using any other suitable techniques for assigning confidence values. The assigned confidence values may then be used to rank the alignment hypotheses for presentation to a human participant or for use in automatically verifying and/or rejecting hypotheses in embodiments that are automated or partially automated, as discussed in further detail below.

In one example utilizing ranking in connection with human involvement, the highest ranked property alignment hypotheses (e.g., the property alignment hypothesis with the highest confidence value) may be presented first followed by any instance alignment hypotheses that correspond to or are a consequence of the property alignment hypothesis, with the instance alignment hypotheses also ordered according to their respective confidence values. The next highest ranked property alignment hypotheses may be presented next along with its associated and/or consequential instance alignment hypotheses and so on. This ordering may be presented spatially or temporally. For example, the ranked alignment hypotheses may be presented simultaneously in a top to bottom arrangement on the presentation (e.g., the user interface). Alternatively, the ranked alignment hypotheses may be presented to the human participant sequentially, whereby the user verifies or rejects an alignment hypothesis (which may comprise a property alignment hypothesis and one or more associated instance alignment hypotheses) before being presented with the next set of alignment hypotheses. However, ranking may be used in other ways and in alternative presentations, as the aspects are not limited in this respect.

In embodiments that involve a human operator, the user interface may provide a mechanism for the human participant to verify or reject each alignment hypothesis. For example, a check box, radio button, or other interface component may be provided in association with each alignment hypothesis to allow the user to quickly and efficiently verify, reject, and/or ignore (i.e., by not providing any indication with respect to a given alignment hypothesis) the corresponding alignment hypothesis. The user interface may be configured to only allow a human participant to positively verify an alignment hypothesis (e.g., by presenting an interface component only for verification) whereby alignment hypotheses that are not verified are implicitly rejected or alternatively are treated as being neither verified nor rejected depending on the design goals of the interface. Alternatively, the interface may be configured to allow a human participant to positively verify as well as positively reject an alignment hypothesis, or allow a human participant only to positively reject an alignment hypothesis. The user interface may be configured in any suitable way to allow the human participant to provide verification, rejection and/or neutrality with respect to the presented alignment hypotheses, as the aspects are not limited in this respect.

According to some embodiments, verification (e.g., act 130) is automated, requiring no human participation. For example, the confidence values of the generated alignment hypotheses may be automatically evaluated and only those alignment hypotheses having a high enough confidence value (e.g., having a confidence value that exceeds a corresponding threshold) may be verified. Additionally or alternatively, consequences (or the confidence values of the consequences) of a given alignment hypothesis may be automatically evaluated to determine whether the alignment hypothesis is correct. For example, returning to the movie example above, while the confidence value associated with the alignment hypotheses of the two movies entitled "Crash" may be relatively high, analyzing the consequence of this alignment hypothesis shows an alignment between theatrical release dates of 1996 and 2004 and/or an alignment between director David Cronenberg and Paul Haggis so that the automated process may reject this alignment hypothesis. Thus, the low confidence scores of the consequences of a given alignment hypothesis may be used to reject the given alignment hypothesis despite the hypothesis itself having a relatively high confidence value.

Likewise, high confidence scores of consequences of a given alignment hypothesis may be automatically evaluated to verify the given alignment hypothesis, potentially in circumstances where the confidence score for the given alignment hypothesis may be relatively low (e.g., a potentially low (relatively) match score between "Casablanca" and "Casablanca (Color)" with high confidence scores for one or more consequences). Thus confidence scores of alignment hypotheses and/or of their consequences can be used to automatically verify and/or reject alignment hypotheses. Automated verification and/or rejection may be performed in other ways, for example, using a trained machine learning model, applying a set of rules and/or using any other suitable technique.

According to some embodiments, verification may be performed using a combination of automated techniques and human participation. For example, assigning confidence scores and evaluating consequences may be considered automated tasks of verification in some implementations, but the ultimate decision may be left up to the human participant. In some embodiments, a human may participate in some iterations (e.g., the first N iterations, where N=1, 2, 3, etc.) and the remainder of the iterations may be performed automatically. Other ways of combining automated and manual verification may be used, as the aspects are not limited in this respect.

Figure 2:
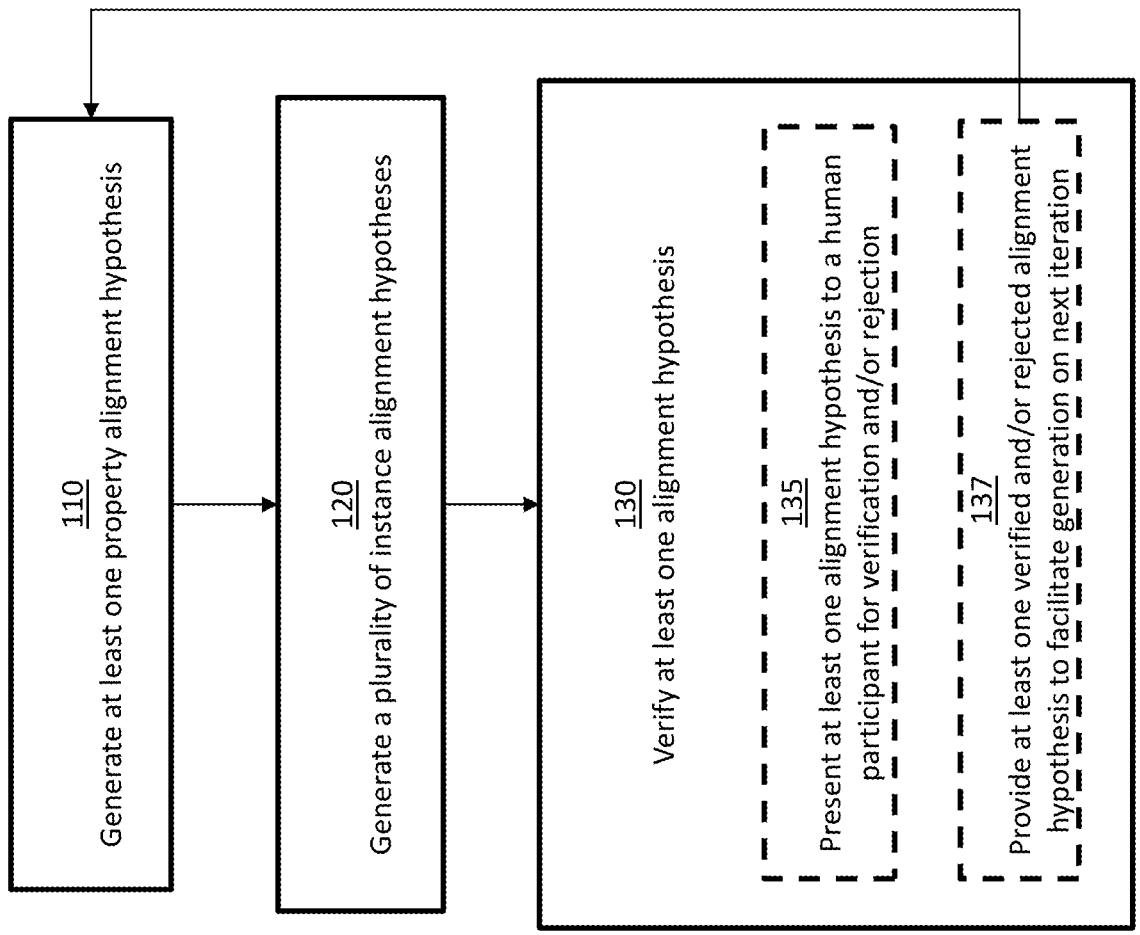
FIG. 2 is a flow chart illustrating an additional exemplary method for aligning a first data source and a second data source, in accordance with some embodiments.

Independent of whether verification and/or rejection of alignment hypotheses is performed automatically, via a human participant, or a combination of both, the results of verification and/or rejection may be provided to facilitate generating one or more alignment hypotheses on the next iteration, as shown by the return to act 110 from act 130 (see also act 137 in FIG. 2). The use of information from previous iterations facilitates improved performance as knowledge about the data sources and the proper alignment thereof is built up over the course of multiple iterations.

Figure 3:
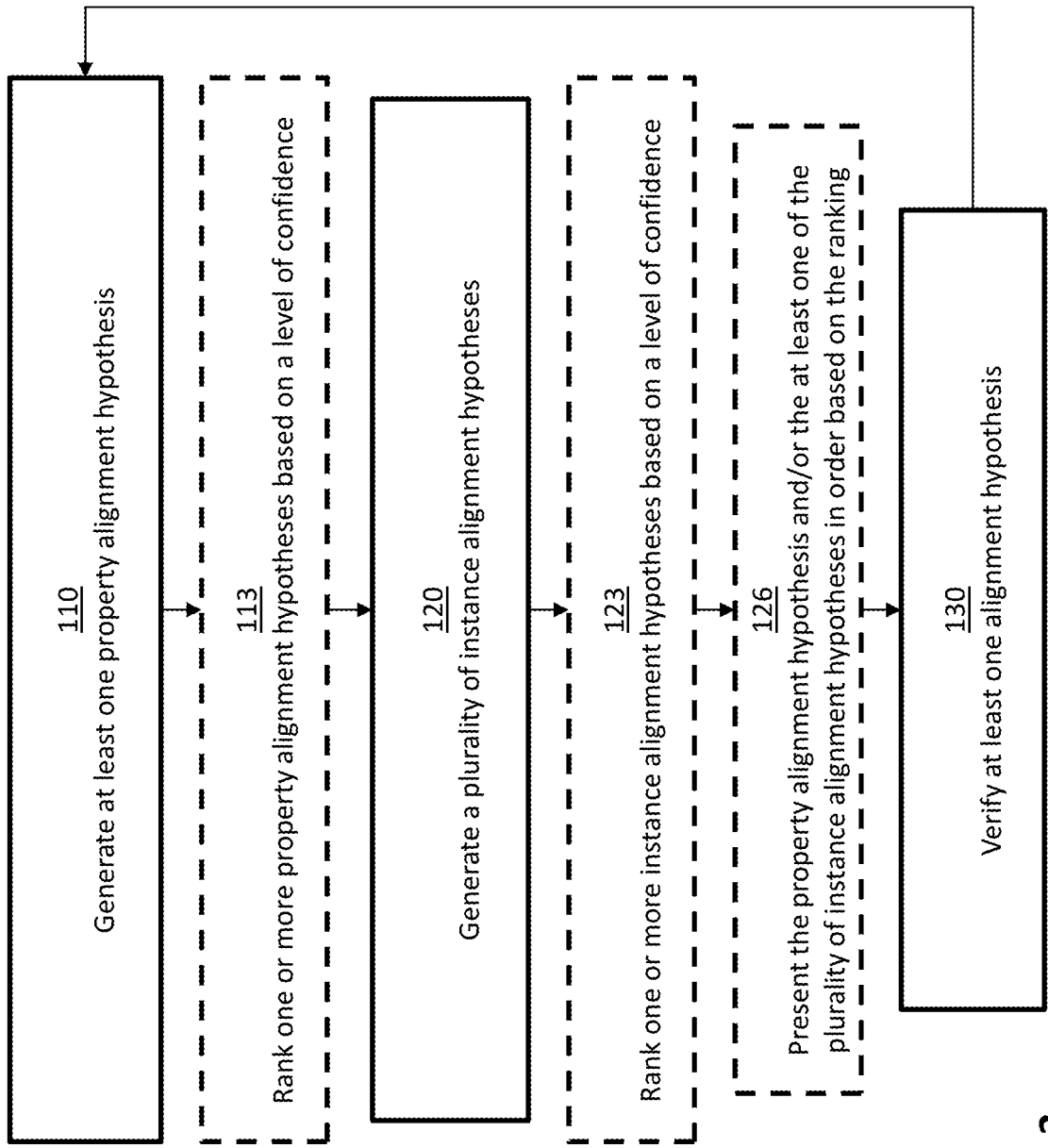
FIG. 3 is a flow chart illustrating a further exemplary method for aligning a first data source and a second data source, in accordance with some embodiments.

FIG. 3 illustrates a method for aligning a first data source and a second data source, in accordance with some embodiments. Acts 110, 120, and 130 may be the same or similar to the corresponding labeled acts described above in connection with FIG. 1. As discussed above, alignment hypotheses may be ranked to facilitate the verification process. In act 113, one or more property alignment hypotheses may be ranked during the current iteration based on a level of confidence for each hypothesis of the one or more property alignment hypotheses. For example, an alignment between "Surname" and "Last Name" (as shown in FIG. 9) may be assigned the highest level of confidence, while an alignment between "Id" and "Full Name" may be assigned a second-highest level of confidence and ranked accordingly. According to some embodiments, instance alignment hypotheses are generated for the top ranked property alignment hypotheses (e.g., for the five property alignment hypotheses having the highest confidence scores). FIG. 29 shows another example of ranking. In some embodiments, act 113 may be part of act 110 and/or may follow after act 110.

According to some embodiments, instance alignment hypotheses are also ranked according to confidence scores assigned to the respective alignment hypothesis (see e.g., act 123) as also discussed in the foregoing. In act 126, alignment hypotheses generated in acts 110 and 120 are presented in order based on the ranking. As discussed above, the ranked property alignment hypotheses and the associated, resulting or consequential instance alignment hypotheses may be provided to a human participant, or the ranked alignment hypotheses may be analyzed automatically. As one example, the five best property alignment hypotheses and a number of the highest ranked instance alignments resulting from these property alignment hypotheses may be analyzed for verification and/or rejection and added to the evolving results set, which allows the system to improve its alignment hypotheses in subsequent iterations.

Figure 13:
FIG. 13 is an illustration of portions of two iterations executed by an alignment system, in accordance with some embodiments.
Figure 14:
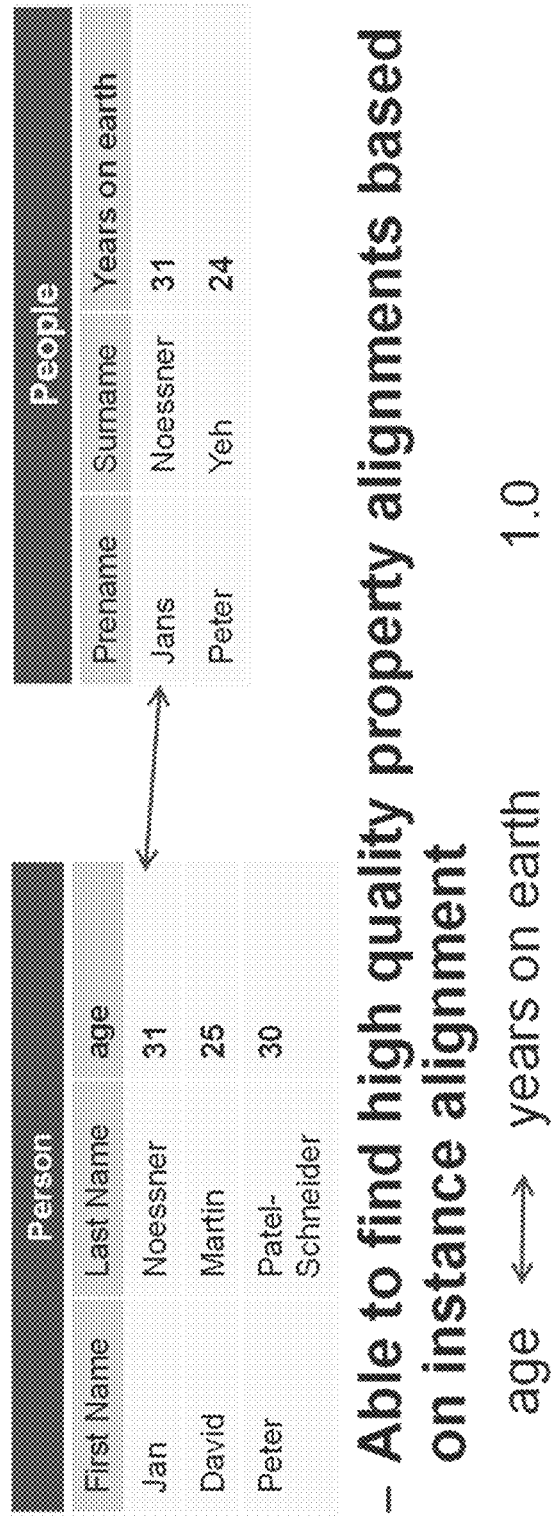
FIG. 14 is an illustration of an alignment system using instance assertions, in accordance with some embodiments.

As an example in the film context, analysis of alignment hypotheses may indicate that the property labeled "Release Date" does correspond to "Theatrical Release Date" but does not correspond to "Blu-Ray Release Date." As another example, analysis of alignment hypotheses may indicate that the property labeled "age" corresponds to "Years on earth" (as shown in FIG. 14) but does not correspond to "Years active" (not shown). Alternatively or additionally, additional alignment hypothesis may be suggested during verification. For example, a user interface may be provided that allows a human participant to indicate correct alignments not proposed during generation, thus facilitating and/or expediting the alignment process. An example of portions of two iterations according to some embodiments is illustrated in FIG. 13.

Figure 4:
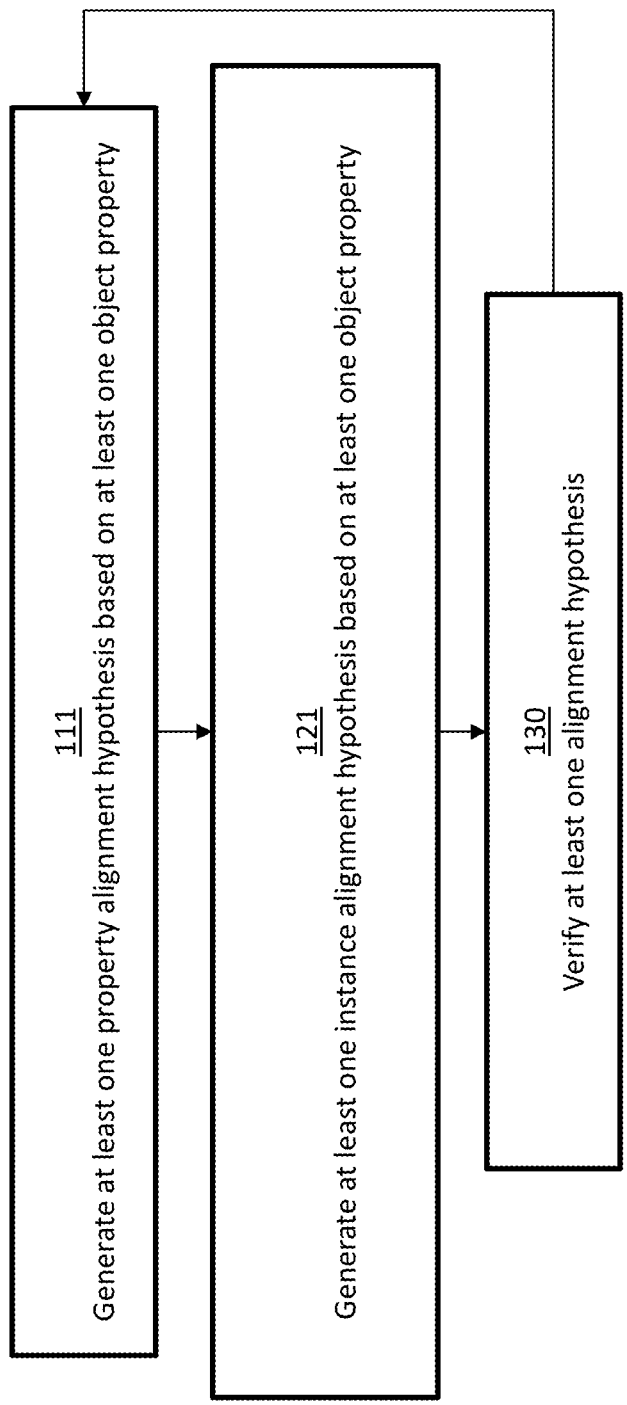
FIG. 4 is a flow chart illustrating another exemplary method for aligning a first data source and a second data source, in accordance with some embodiments.

FIG. 4 illustrates a method for aligning a first data source and a second data source, in accordance with some embodiments. The method of FIG. 4 may be similar in many respects to the method illustrated in FIG. 1, with exploration of the instance search space via object properties. For example, in act 111, the system may, during at least one iteration, generate a property alignment hypothesis between at least one first property of a first data source and at least one second property of a second data source based on at least one object property associated with the at least one first property and the at least one second property and optionally based on a property alignment hypothesis and/or at least one of a plurality of instance alignment hypotheses verified during a previous iteration. In other words, the system may consider an object property, which may refer to another object that has its own properties, such as a foreign key in a relational database. Considering an object property may cause the system to consider properties of an object in another table, database, or data source. For example, if a movies table includes a foreign key in a director property, the system may go from the movies table to a directors table, and if the directors table includes a foreign key in a studio property, the system may go from the directors table to a studios table.

In act 121, at least one alignment hypothesis is generated during the current iteration based, at least in part, on at least one object property. As discussed above, considering an object property may cause the system to consider properties of an object in another table, database, or data source, which may then lead to consideration of additional instances that may be examined for use in generating one or more instance alignment hypotheses. It should be appreciated that act 110 and 120 described in connection with FIG. 1 may also be performed during the generation of alignment hypotheses in the method illustrated in FIG. 4. Act 130 may be similar or the same as act 130 described above in connection with FIG. 1.

Figure 5:
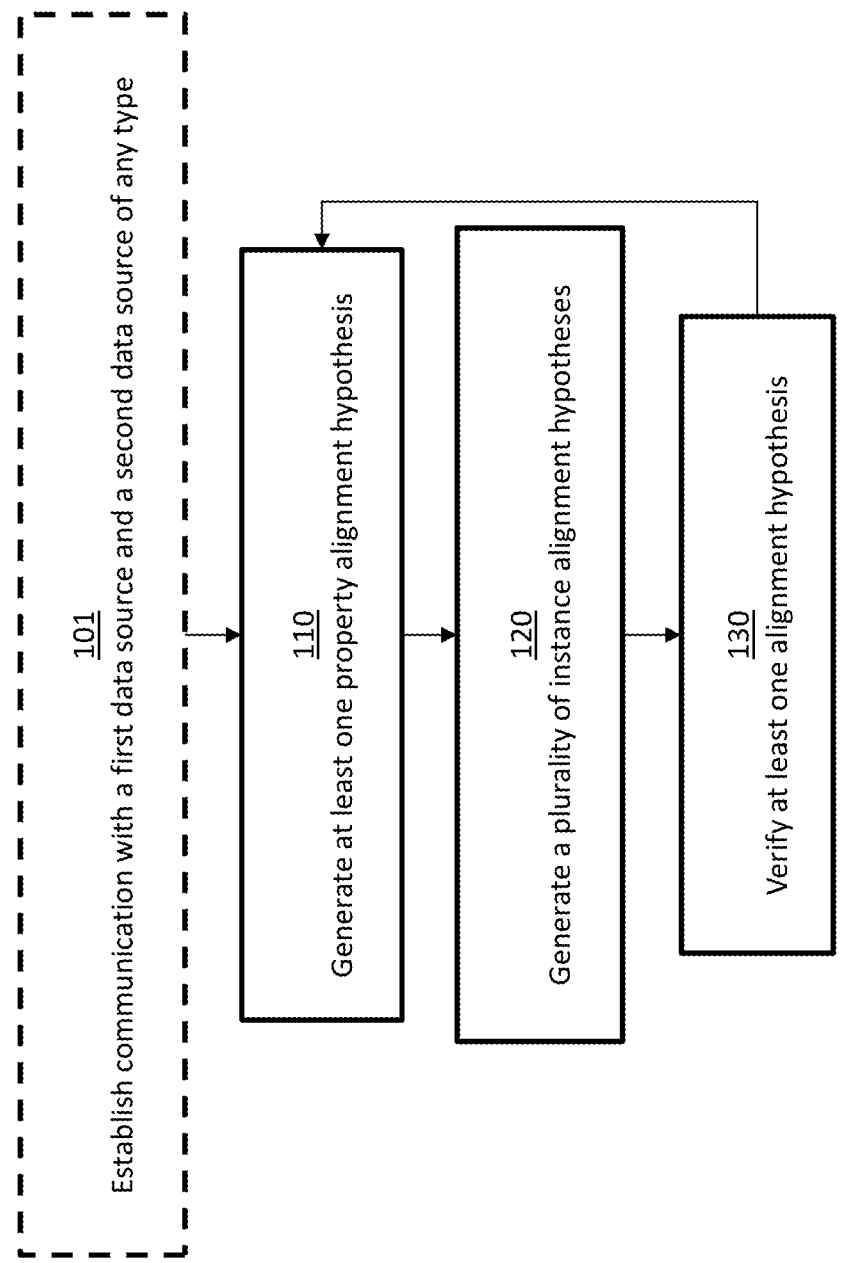
FIG. 5 is a flow chart illustrating an additional exemplary method for aligning a first data source and a second data source, in accordance with some embodiments.
Figure 15:
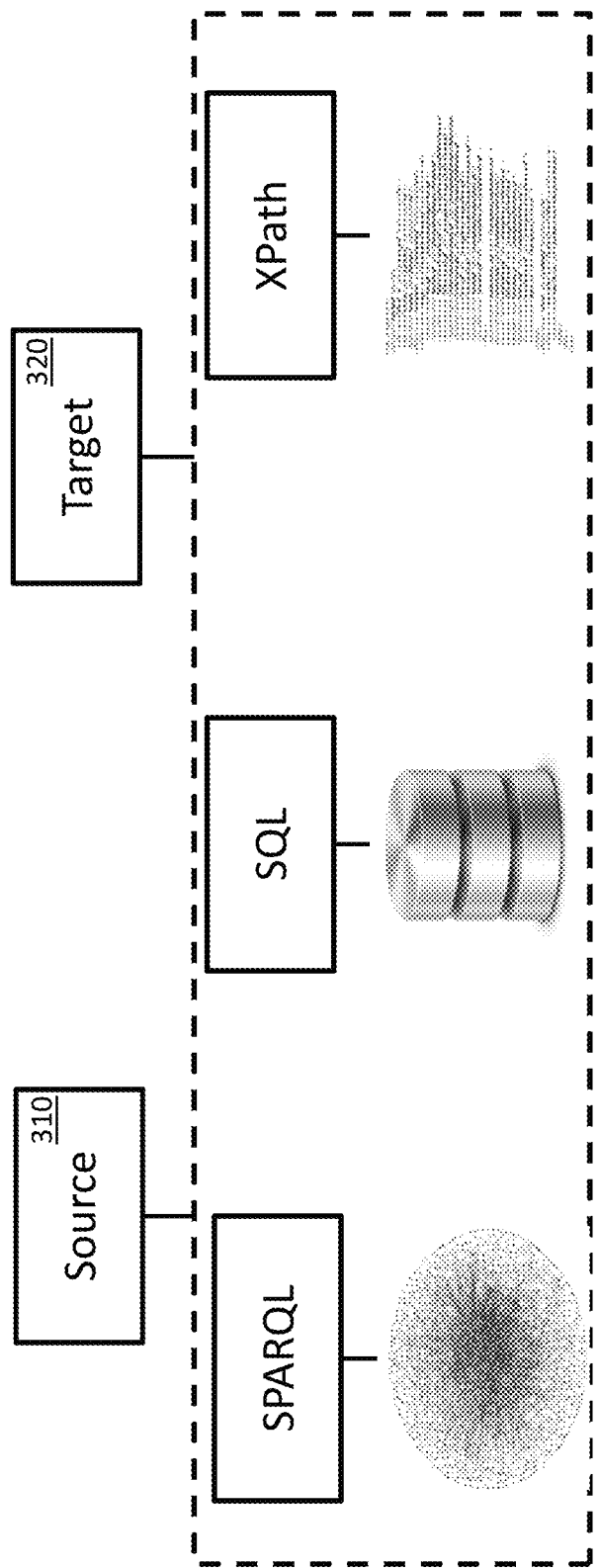
FIG. 15 is a diagram illustrating many different types of data sources as both a source and a target, in accordance with some embodiments.
Figure 16:
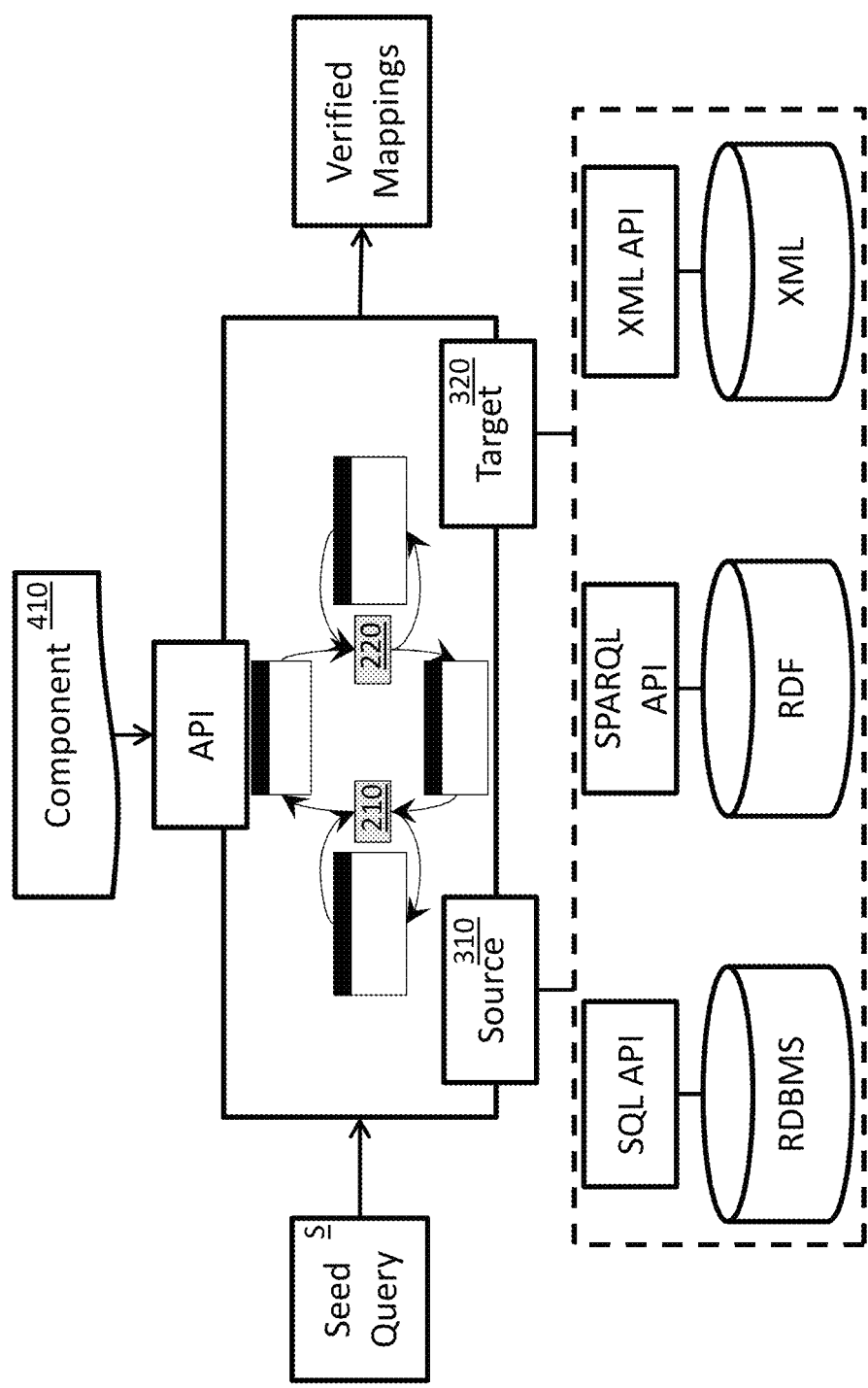
FIG. 16 is a diagram illustrating an alignment system that supports many different types of data sources as both a source and a target, in accordance with some embodiments.

As discussed above, the techniques described herein may be utilized with databases of differing types or formats. According to some embodiments, an alignment system may be designed to communicate with many different types of data stores, in many different formats (see FIG. 5 act 101). For example, the alignment system may support RDF accessed via SPARQL, relational databases, and/or general XML based files as source 310 or target 320, as shown in FIGS. 15 and 16. The alignment system may include a connector interface that allows this list to be easily extended by implementing the connector interface. The connector interface may provide a generic interface that can be configured to communicate with any number of types of data sources.

Figure 6:
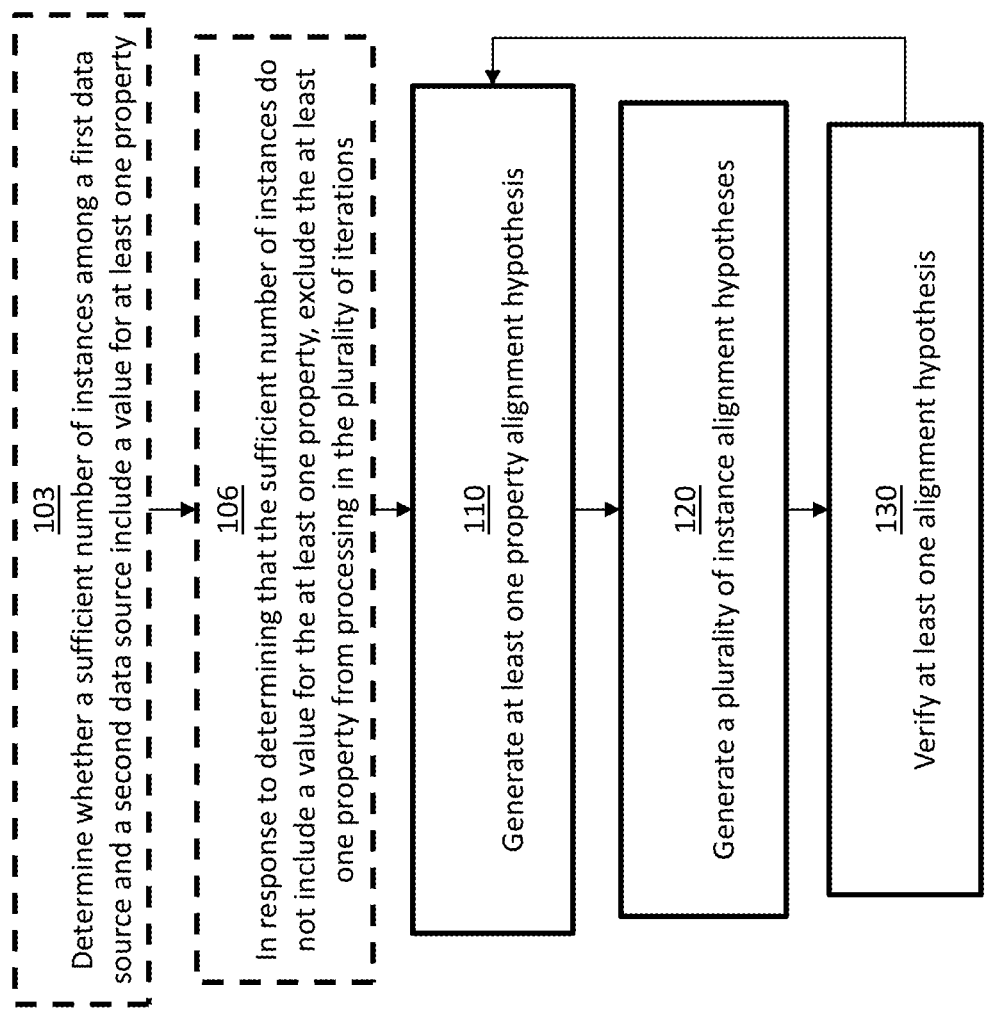
FIG. 6 is a flow chart illustrating a further exemplary method for aligning a first data source and a second data source, in accordance with some embodiments.

As discussed above, in generating alignment hypotheses, whether a property includes sufficient instance values may be evaluated prior to using that property to generate an alignment hypothesis. For example, FIG. 6 illustrates a method for aligning data sources having an act 103 that determines whether a sufficient number of instances among the first data source and the second data source include a value for at least one property. For example, the system may determine whether the number (or percentage) of actual instances with a value for the property labeled "Middle Name" in a data source of author information is above a parameter ϕ. For further illustration, there may exist properties and/or instances which have no or almost no assertions, especially in large RDF knowledge bases and XML documents. To ensure the effectiveness of the system, those assertions may be ignored in some embodiments. To cope with that issue, the system may have an optional parameter ϕ to filter instances and data properties with sparse value assertions. For example, the system may ignore a data property (such as one labeled "age") if 50% or less of instances do not include assertions for that data property (e.g., if half or less of actors in a database have an age listed).

In act 106, the system may, in response to determining that a sufficient number of instances do not include a value for the at least one property, exclude the at least one property from processing in the plurality of iterations. For example, if the number or percentage (or any other measure) of instances with a value for the property labeled "Middle Name" in the data source of author information is not above the parameter ϕ, the system may ignore that property, as described herein.

Alternatively or additionally, for some properties, a given instance may have multiple values. For example, an author's last name may be spelled in two different ways, Dostoyevsky and Dostoevsky, both of which may be accurate. To handle multiple values, the system may concatenate multiple values for comparison. This can be an effective technique for handling these circumstances. Acts 110, 120, and 130 in FIG. 6 may be the same or similar to the corresponding labeled acts described above in connection with FIG. 1.

Figure 7:
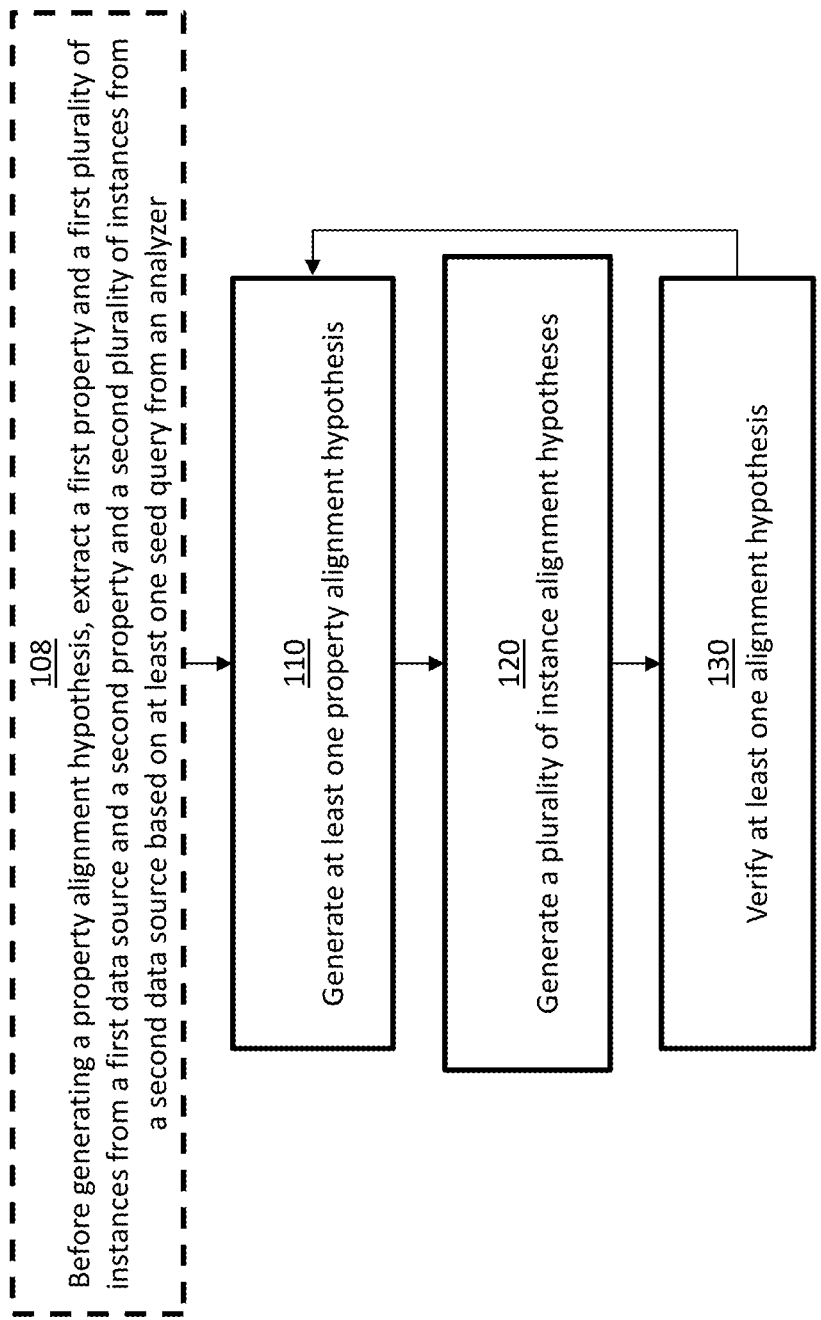
FIG. 7 is a flow chart illustrating another exemplary method for aligning a first data source and a second data source, in accordance with some embodiments.
Figure 18:
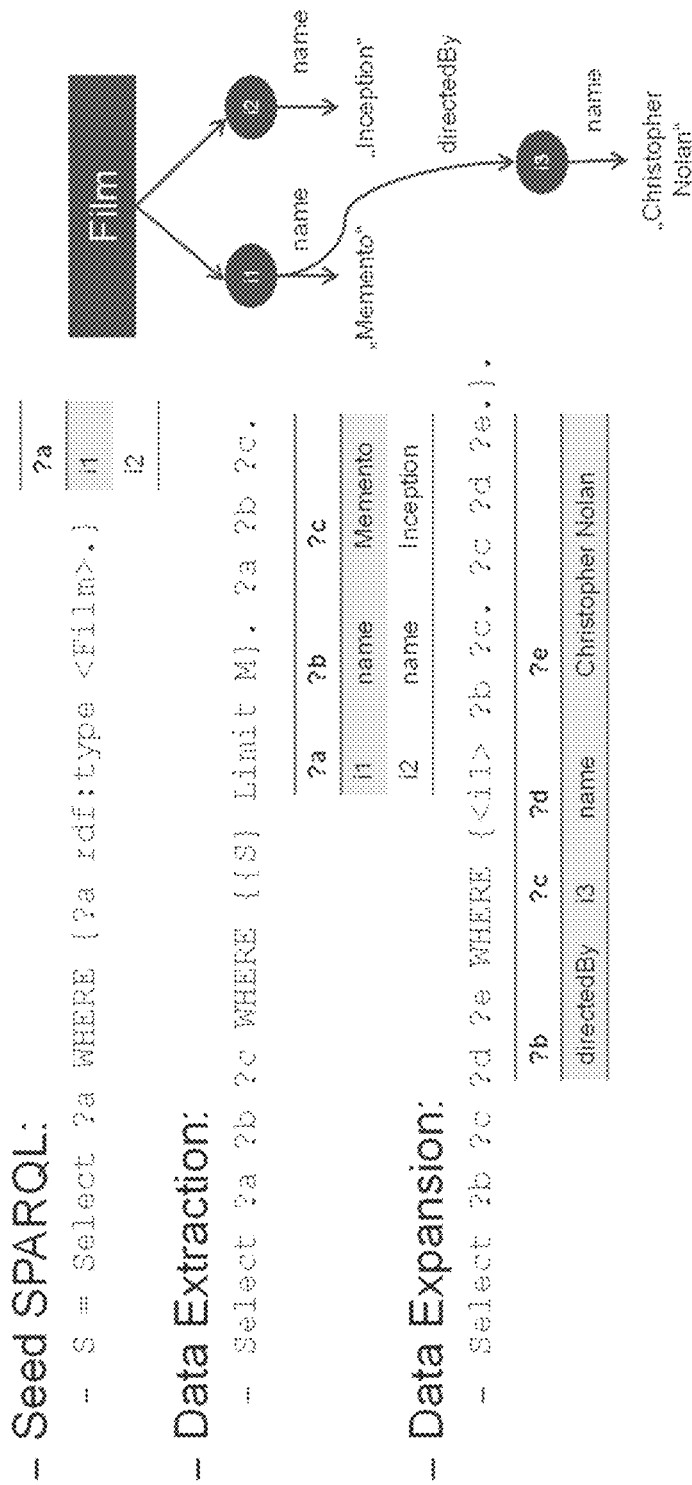
FIG. 18 is an illustration of an exemplary seed query and data extraction and expansion queries and results of an alignment system using RDF knowledge bases, in accordance with some embodiments.
Figure 20:
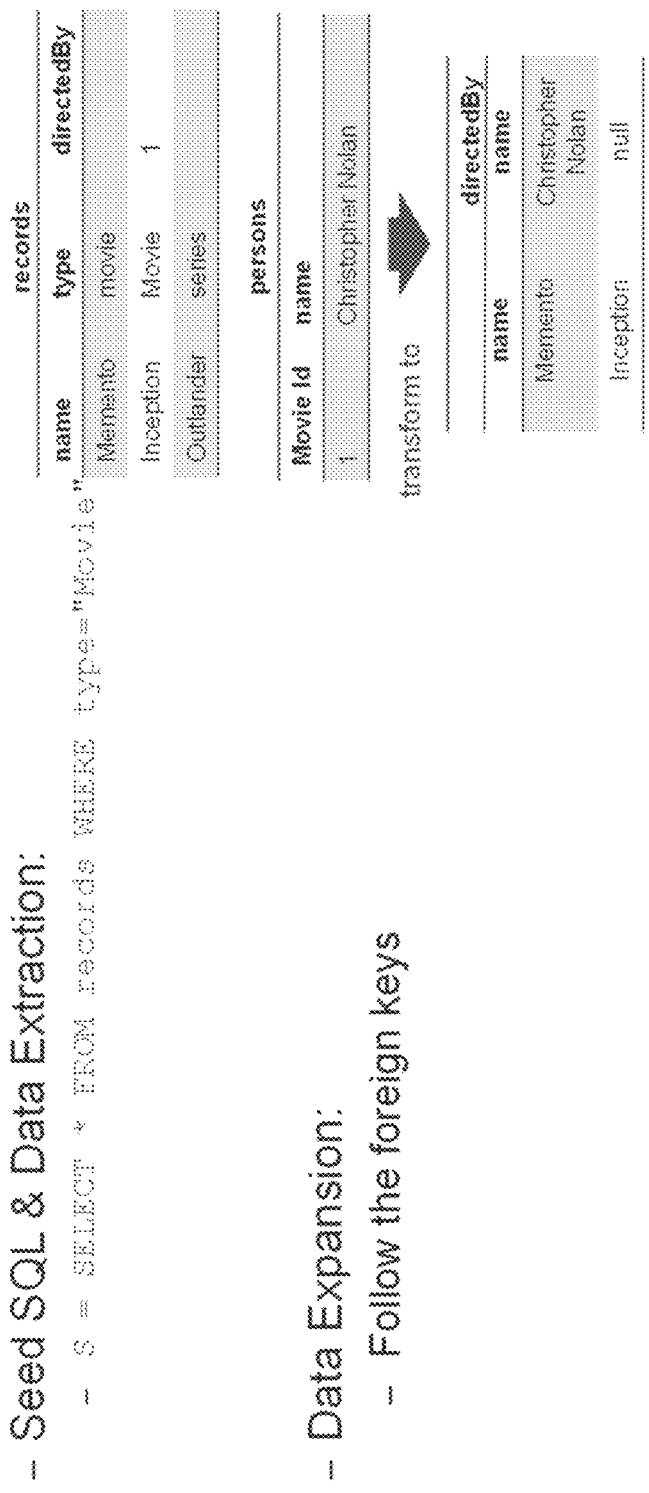
FIG. 20 is an illustration of an exemplary seed query, results, and transformations of an alignment system using relational databases like SQL, in accordance with some embodiments.
Figure 21:
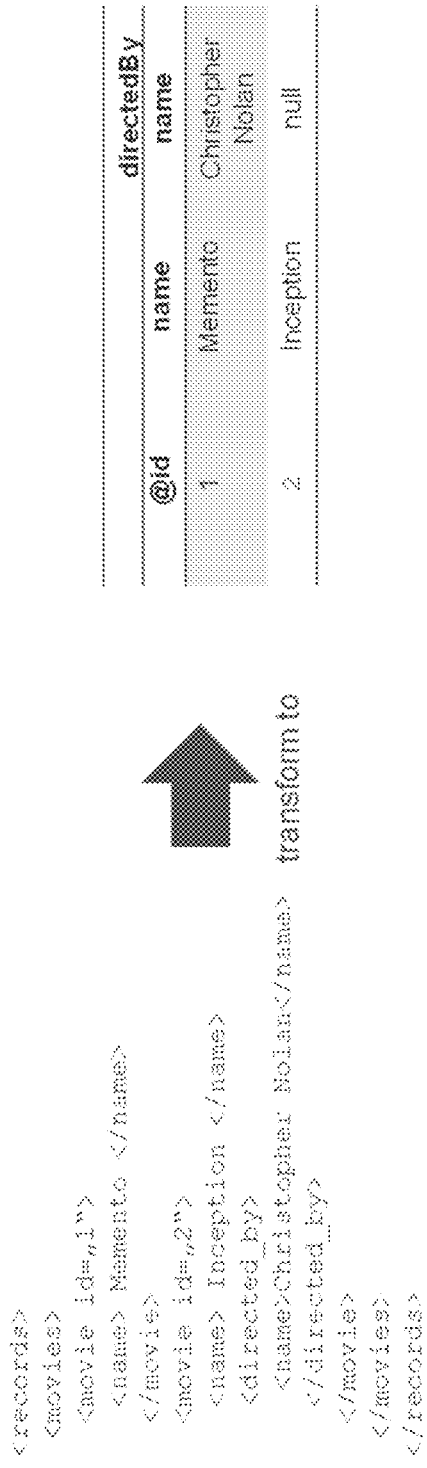
FIG. 21 is an illustration of an exemplary XPath expression and transformations of an alignment system using XPath and XML, in accordance with some embodiments.

As discussed above, generating alignment hypotheses may rely on verified and/or rejected alignment hypotheses from one or more previous iterations. According to some embodiments, a first iteration may use at least one seed query. For example, FIG. 7 illustrates a method for aligning data sources wherein, in an act 108, before generating a property alignment hypothesis in act 110, a first property and a first plurality of instances may be extracted from the first data source, and a second property and a second plurality of instances from the second data source, based on at least one seed query. As one example, a human participant may provide a seed query S or a seed query S may be generated automatically. The seed query may provide a starting point in the data sources for the system (exemplary seed queries are illustrated in FIGS. 18, 20, and 21, as described further below). For example, the space (e.g., of ontology elements in RDF stores or of schema elements in relational and XML stores) that the alignment system considers may be constrained by the seed query.

In some embodiments, in acts 110 and 120, the system may, based on a seed query, generate an alignment hypothesis, which may then be verified (or rejected) in act 130. For example, the system may generate the hypothesis that the class "MOVIE" in data source A corresponds to the table "MOTION PICTURE" in data source B. In act 130, such a hypothesis may be verified or rejected either automatically or via a human participant. Additionally, the system may expand from this seed query. Alternatively, the seed query may be generated by the system itself and included in the iteration(s).

For further examples, FIGS. 18 and 19 illustrate an exemplary seed query and data extraction and expansion queries, results, and transformations according to some embodiments using RDF knowledge bases. FIG. 20 illustrates an exemplary seed query, results, and transformations according to some embodiments using relational databases like SQL. FIG. 21 illustrates an exemplary XPath expression and transformations according to some embodiments using XPath and XML.

Figure 8:
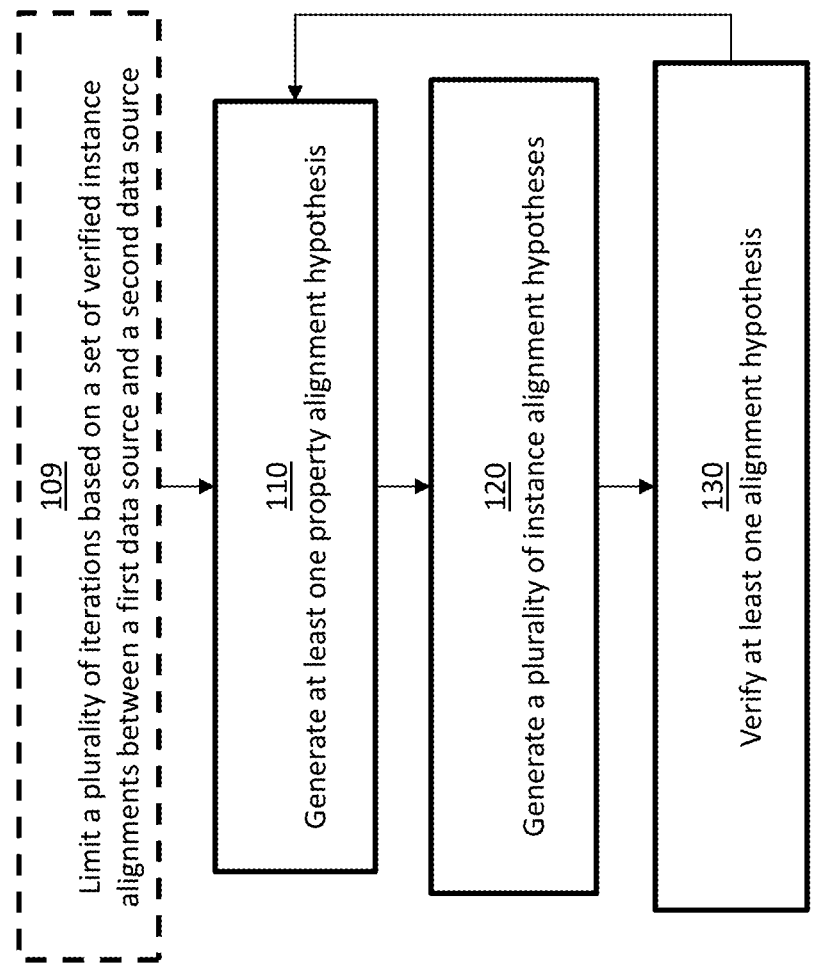
FIG. 8 is a flow chart illustrating an exemplary method for aligning a first data source and a second data source, in accordance with some embodiments.

The inventors have recognized and understand that, in order to decrease processing time in generating and verifying alignment hypotheses, verifications can be used to limit what alignments need further consideration and how many iterations in which to consider them. In some embodiments, instance alignments may be constrained by the domains and ranges of property alignments. FIG. 8 act 109 illustrates an example of limiting the plurality of iterations.

Figure 10:
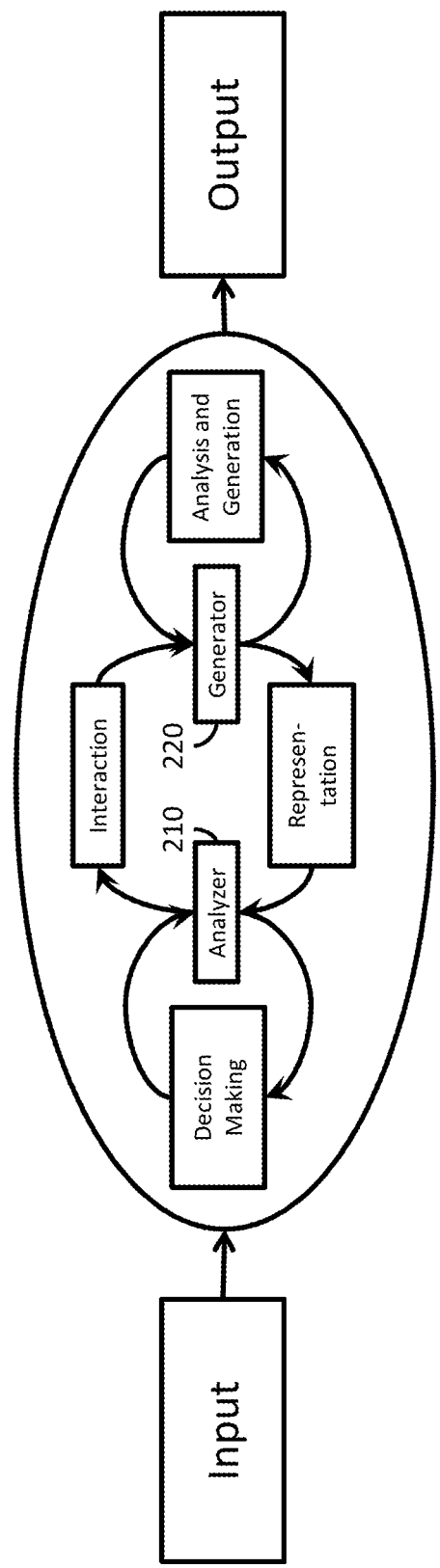
FIG. 10 is a block diagram illustrating a cognitively-inspired, iterative alignment system, in accordance with some embodiments.
Figure 11:
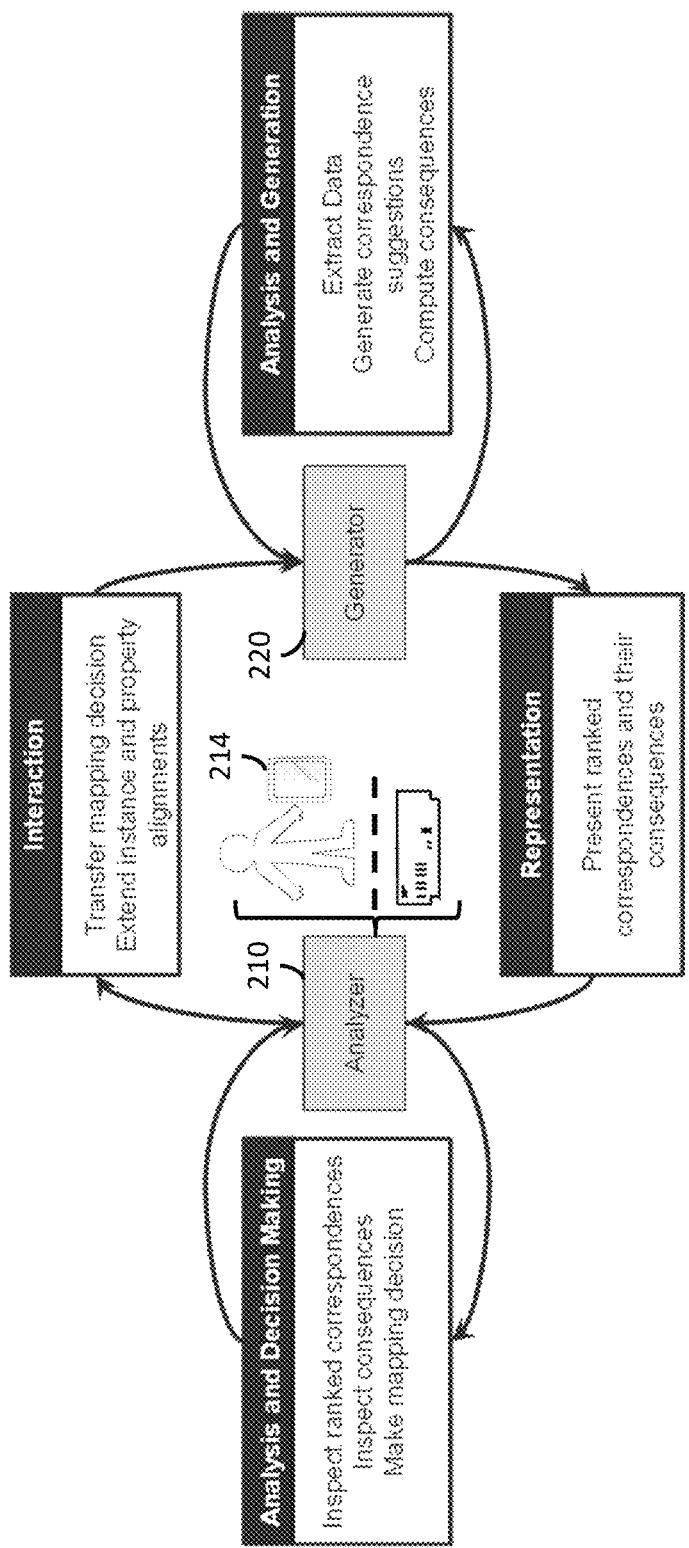
FIG. 11 is a block diagram illustrating an alignment system that may distinguish between an analyzer and a generator, in accordance with some embodiments.

FIGS. 10 and 11 pictorially illustrate an example of an iterative approach to data source alignment, in accordance with some embodiments. For example, the system in FIGS. 10 and 11 includes an analyzer 210 and a generator 220. According to some embodiments, analyzer 210 and generator 220 are implemented as software components of an alignment system configured to align data sources using an iterative approach. Generator 220 may be configured to generate property alignment hypotheses and/or instance alignment hypotheses using any of the techniques described herein and provide the alignment hypotheses to analyzer 210.

Analyzer 210 may be configured to analyze the generated alignment hypotheses to verify and/or reject the alignment hypotheses using any of the techniques described herein. For example, analyzer 210 may be automated, may present one or more alignment hypotheses to a human participant (e.g., as schematically illustrated by human participant 214 in FIG. 11), or may combine both automated and manual techniques to verify and/or reject generated alignment hypotheses, as the aspects are not limited in this respect. Analyzer 210 may be configured to provide verified and/or rejected alignment hypotheses or information indicative thereof to generator 220 for a next iteration of generating alignment hypotheses.

As discussed above, an alignment hypothesis refers to an assertion that a property or an instance in one data source aligns or maps to a property or an instance in another data source. Such an alignment hypothesis can be verified or rejected. As further discussed above, a confidence value or score may be assigned to an alignment hypothesis to indicate a confidence in the correctness or validity of the corresponding alignment hypothesis. Thus, an alignment hypothesis may be represented as a 4-tuple $\langle e_s, e_t, r, c \rangle$, where $e_s$ and $e_t$ are source and target entities, r is a semantic relation, and c is a confidence value (usually, $c \in [0,1]$). According to some embodiments, the system may focus on equivalence relations $\langle e_s, e_t, \equiv, c \rangle$.

Figure 12:
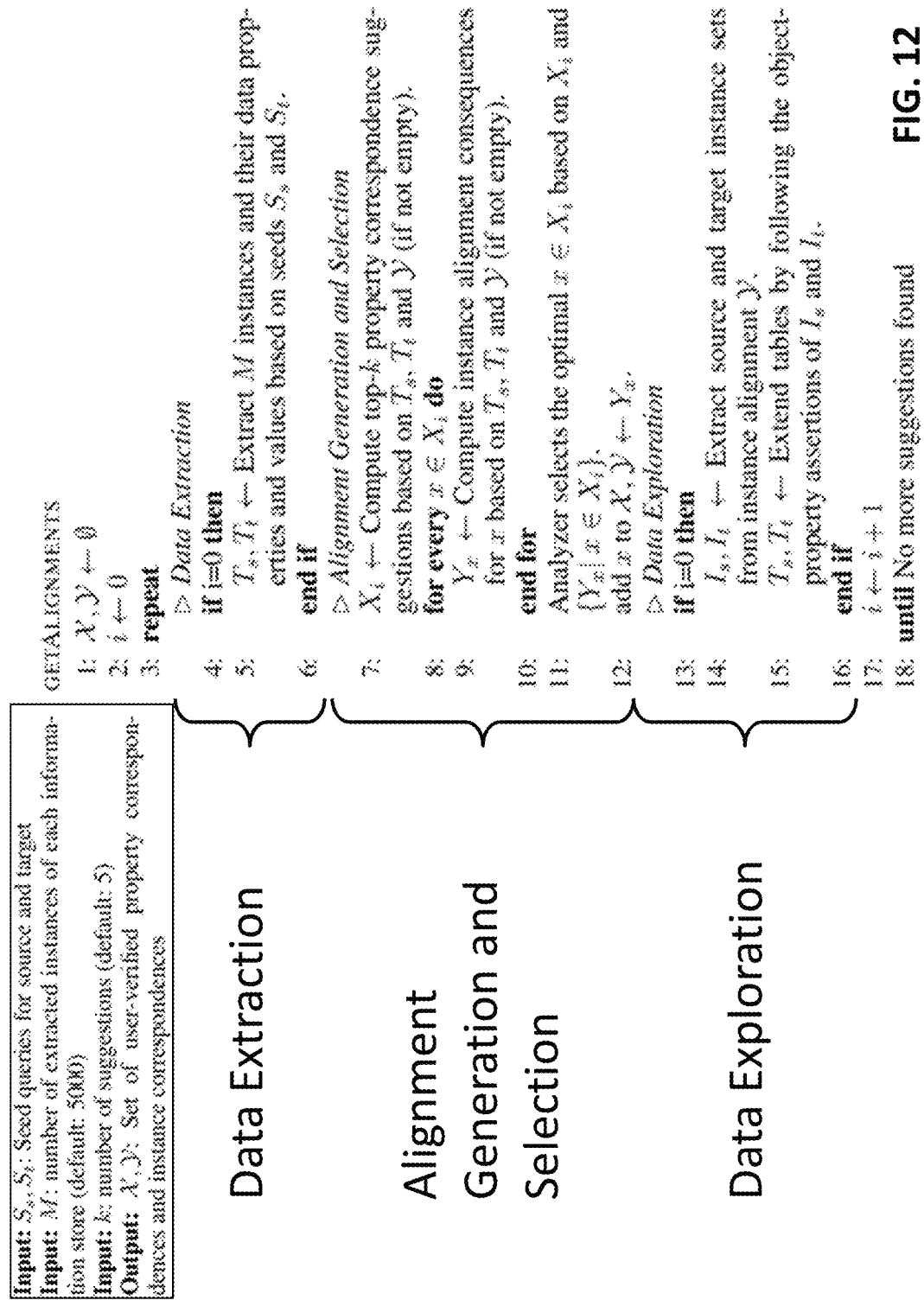
FIG. 12 is an illustration of an exemplary algorithm for an alignment system, in accordance with some embodiments.

FIG. 12 illustrates an exemplary three phase alignment process, including a data extraction phase, alignment and generation phase, and a data exploration phase. According to some embodiments, the data extraction phase (lines 4-6 in FIG. 12) and the data exploration phase (lines 13-16 of FIG. 12) may be executed in the first iteration (i=0) only. Generally, the alignment generation and selection phase (lines 7-12 of FIG. 12) phase is repeated until no more alignment hypotheses are found, or further generation is not desired. For example, in some embodiments, the alignment generation and selection phase may correspond to acts 110, 120 and 130 illustrated in FIG. 1.

In the data extraction phase, the system may extract all data property names and their corresponding values for M instances into a source table $T_s$ and a target table $T_t$ (line 5 of FIG. 12). An example of the general form of $T_s$ and $T_t$ after extraction is illustrated in the left block (2nd column) of FIG. 17. Initially, the direct data properties and the corresponding data may be imported (as shown in the left block of FIG. 17). In the data exploration phase, the search space may be explored by following object properties (as shown in the right blocks of FIG. 17, where dp=data property, op=object property, i=instance, and v=value). In other words, for each object property op of an instance i, the object that is the value of that property may be examined. Then, for each data property of that object, the system may add its value to the row for i. Thus, the right blocks of FIG. 17 ($op_a, op_b, \ldots$) may be added during this phase. The reason this exploration may happen at the end of the first iteration in some embodiments (i=0, line 13-16 in FIG. 12) is that there may exist many object properties to follow. This often leads to a large amount of data. Thus, the system may aim to restrict the exploration to the smaller instance sets $I_s$ and $I_t$. These instance sets may be extracted from the first instance alignment y (line 15) such that $I_s = \{e_s | \langle e_s, e_t, \equiv, c \rangle \in y\}$ and $I_t = \{e_t | \langle e_s, e_t, \equiv, c \rangle \in y\}$. Then, the system may follow the object properties for the instance sets $I_s$ and $I_t$, which are usually much smaller.

Different database types may involve different operations. For example, for RDF repositories, the alignment system may utilize SPARQL queries to access data. The system need not rely on the completeness of domain and range restrictions for extracting properties, since they are often poorly defined (e.g., in DBPedia). Instead, the system may take the distinct set of all properties of the relevant instances (those retrieved by S for extraction or those identified as values of object properties for expansion) as the relevant data properties. For relational data extraction, the system may add the limit M to the seed SQL query S, execute the query, and store the result in table T. For exploration, the system may follow the foreign keys according to the definitions in the database schema. For XML files, the system may extract each attribute and each direct child node that has a primitive value from the initial XPath expression S. In some embodiments, the system may store both attribute and child node values as data properties, such as shown in FIG. 17. For the exploration phase, the system may inspect the children x of all non-primitive nodes. From these nodes, the system may again store the values of every attribute and every direct child node that has primitive values.

According to some embodiments, the space of ontology elements (in RDF stores) or schema elements (in relational and XML stores) that are considered is constrained by the seed information S. Additionally, instance alignments may be constrained by the domain and ranges of property alignments. For example, if the system aligns a property $e_s$=id to a property $e_t$=movieName, then the resulting instance alignment is bounded by $S_s$=movie and $S_t$=film as domains. Thus, there is no need to consider possible alignments involving other instances in the information stores.

According to some embodiments, in addition to the standard property to property, object property to object property, and instance to instance alignment hypotheses, the system may also support alignment hypothesis between property and object-property (e.g., $e_t$=film/country/./name/ and $e_s$=movie/language).

According to some embodiments, the system may first compute the top-k property alignment hypotheses $X_i$, as shown in Line 7 of FIG. 12. In the first iteration (i=0), the system may use all available instance data, as no instance alignment may exist yet (y=∅). For computational reasons, the system may use an implicit cutoff at this initial stage. In the following iterations, the system may improve the hypotheses by considering the instance alignments from the previous iteration and comparing the property values only for the instance pairs in y. In these iterations, the system may not apply any threshold, but rather the system may rank the alignment hypotheses at the end.

In some embodiments, the system may proceed to compute the consequences $Y_x$ for the top-k hypotheses $X_i$, as shown in lines 8-10 of FIG. 12. That is, for each of those property alignment hypotheses, the system may compute the instance alignment that will result if this alignment hypothesis is generated. Initially (i=0), all source instances may be compared against all target instances. In following iterations, the system may use the instance alignment y from the previous iteration to compute the new alignment. The threshold applied for the instance alignment may equal the confidence value c of $\langle e_s, e_t, \equiv, c \rangle \in X_i$.

In some embodiments, the optimal $x \in X_i$ based on the hypotheses $X_i$ and the consequences $\{Y_x | x \in X_i\}$ is selected. As discussed above, this selection can either be made by a human user or selected automatically based on the confidence value and the hypotheses. After selection of x, the system may update the seed property alignment x and the seed instance alignment y for the next iteration.

Figure 22:
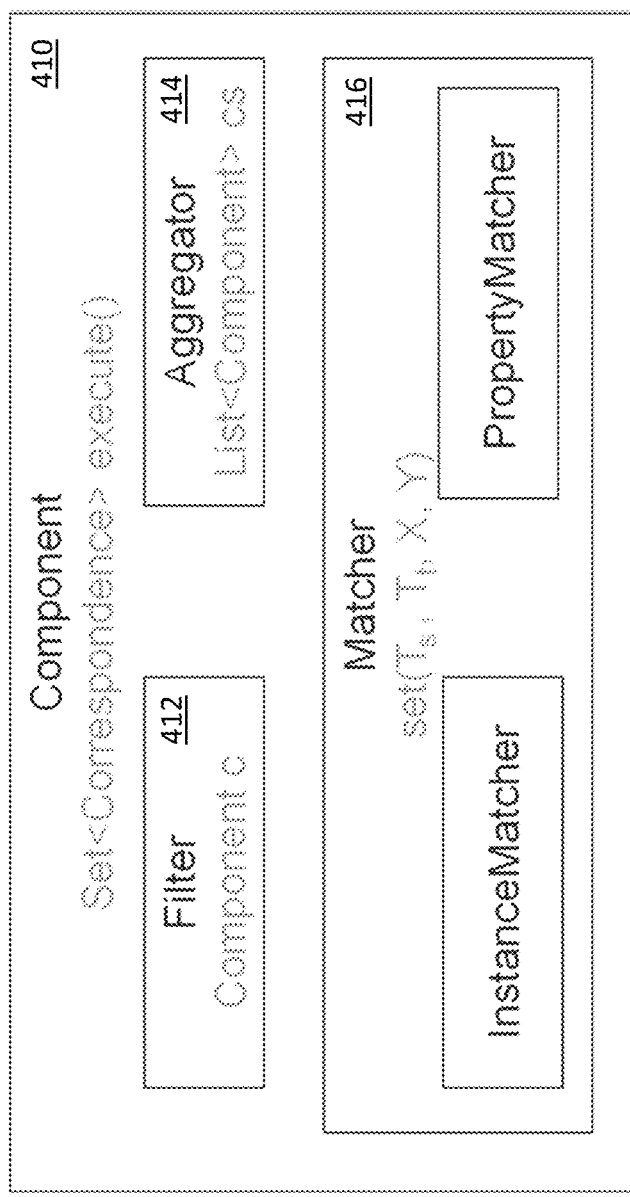
FIG. 22 is a block diagram of components of an alignment system, in accordance with some embodiments.

According to some embodiments, the system may support many different components 410, such as the components 410 illustrated in FIG. 22, to match instances and properties and perform any of the processes described above (FIG. 23 provides a short explanation of the functionality of the components 410). For example, every Filter 412, Aggregator 414, and Matcher 416 may be a component 410. Each component 410 may have an execute( ) method, which may return a set of alignments.

Figure 24:
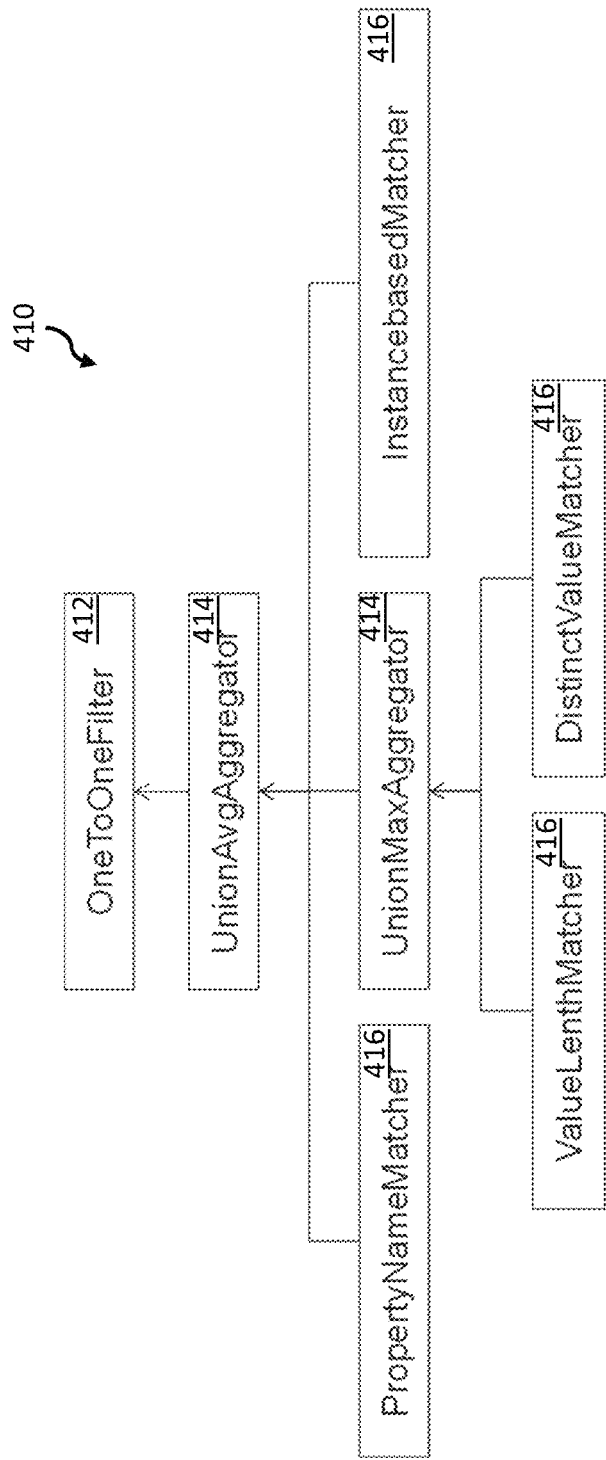
FIG. 24 is a block diagram of components of an alignment system in a tree form, in accordance with some embodiments.
Figure 25:
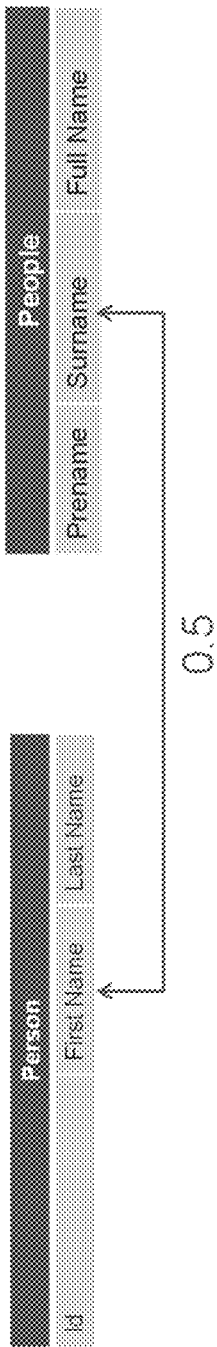
FIG. 25 is an illustration of a property name matcher of an alignment system, in accordance with some embodiments.
Figure 26:
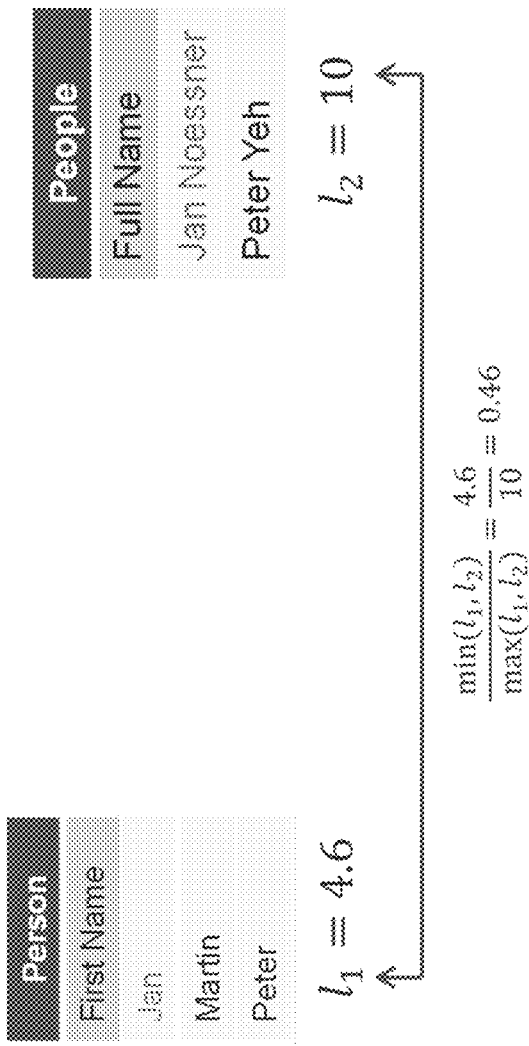
FIG. 26 is an illustration of a value length matcher of an alignment system, in accordance with some embodiments.

According to some embodiments, the components 410 may be organized as a tree, as shown in FIG. 24 (with the "tree" being upside-down). Additionally, the Matchers 416 may form the leaves and may include a property name matcher (FIG. 25), a value length matcher (FIG. 26), a distinct value matcher (FIG. 24), and/or an instance based matcher (FIG. 27). In some embodiments, the Matchers 416 may take a source table $T_s$, a target table $T_t$, a set of previously verified property alignments x, and a set of instance alignments y from the previous iteration as input. In some embodiments, the Matchers 416 may match schema between data sources, such as a property name matcher matching similar property names between data sources (such as a "First Name" and a "Surname" as shown in FIG. 25), a value length matcher matching properties with similar average value lengths between data sources (such as "First Name" and "Full Name" as shown in FIG. 26), a distinct value matcher matching distinct values between data sources, and/or an instance based matcher matching data between the data sources based on similar instances of the data sources (as shown in FIG. 27).

Figure 28:
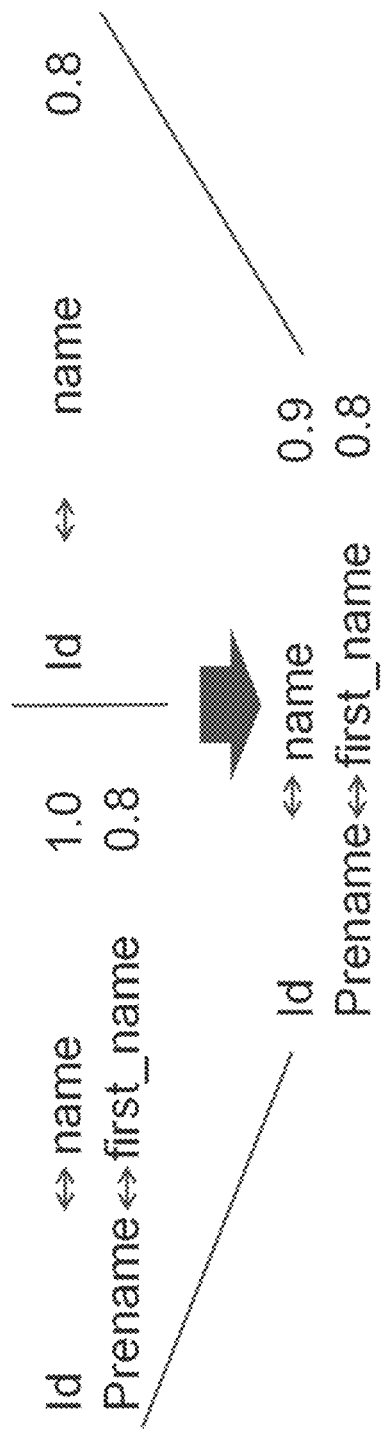
FIG. 28 is an illustration of a union average aggregator of an alignment system, in accordance with some embodiments.

According to some embodiments, an Aggregator 414 may execute every component 410 in the list cs (as shown in FIG. 22) and aggregate the results. In some embodiments, the Aggregator 414 may, for example, just take the maximum confidence value c of all alignment hypotheses with equal entities $e_s$ and $e_t$, which may be referred to as a union max aggregator (FIG. 24). Alternatively or additionally, an Aggregator 414 may include a union average aggregator (FIG. 28), which may average confidence values if alignment hypotheses share the same source entity $e_s$ and $e_t$.

According to some embodiments, a Filter 412 may reduce the size of the alignment of the Filter's component 412 after execution. A simple filter 412 (such as a top k filter as shown in FIG. 23) might, for example, only return the alignment hypotheses for which confidence values c are above a certain threshold. In some embodiments, a one-to-one filter may return a functional one-to-one alignment using a greedy strategy, as shown in FIG. 29. First, the filter may order the alignment hypotheses in descending order. Then, the filter may traverse through the list and drop all alignment hypotheses whose entities $e_s$ and $e_t$ have been already matched.

Figure 30:
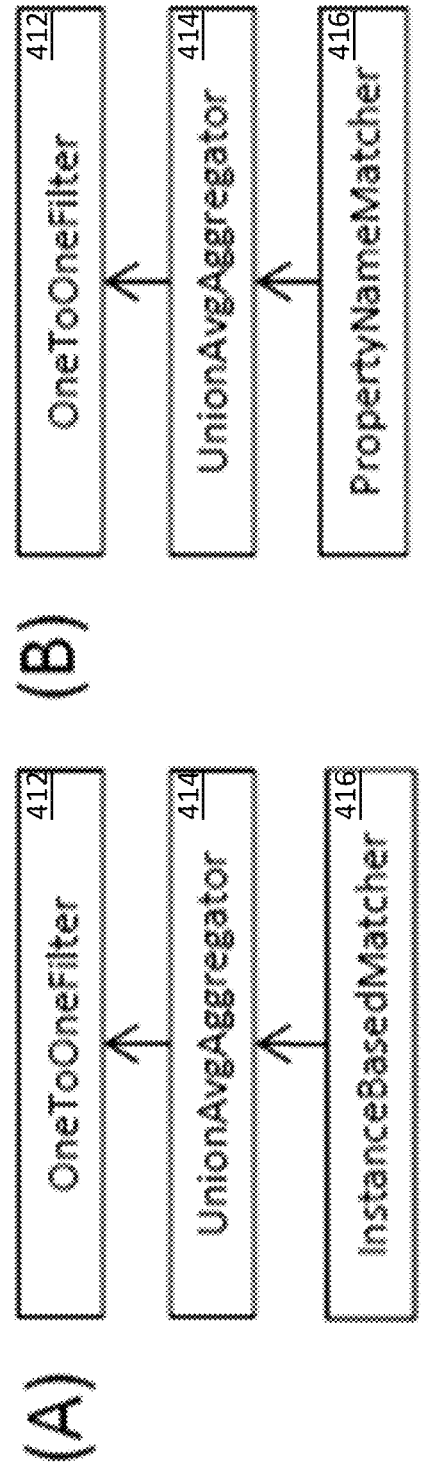
FIG. 30 is an illustration of exemplary component trees and benchmarks used to evaluate an alignment system, in accordance with some embodiments.
Figure 33:
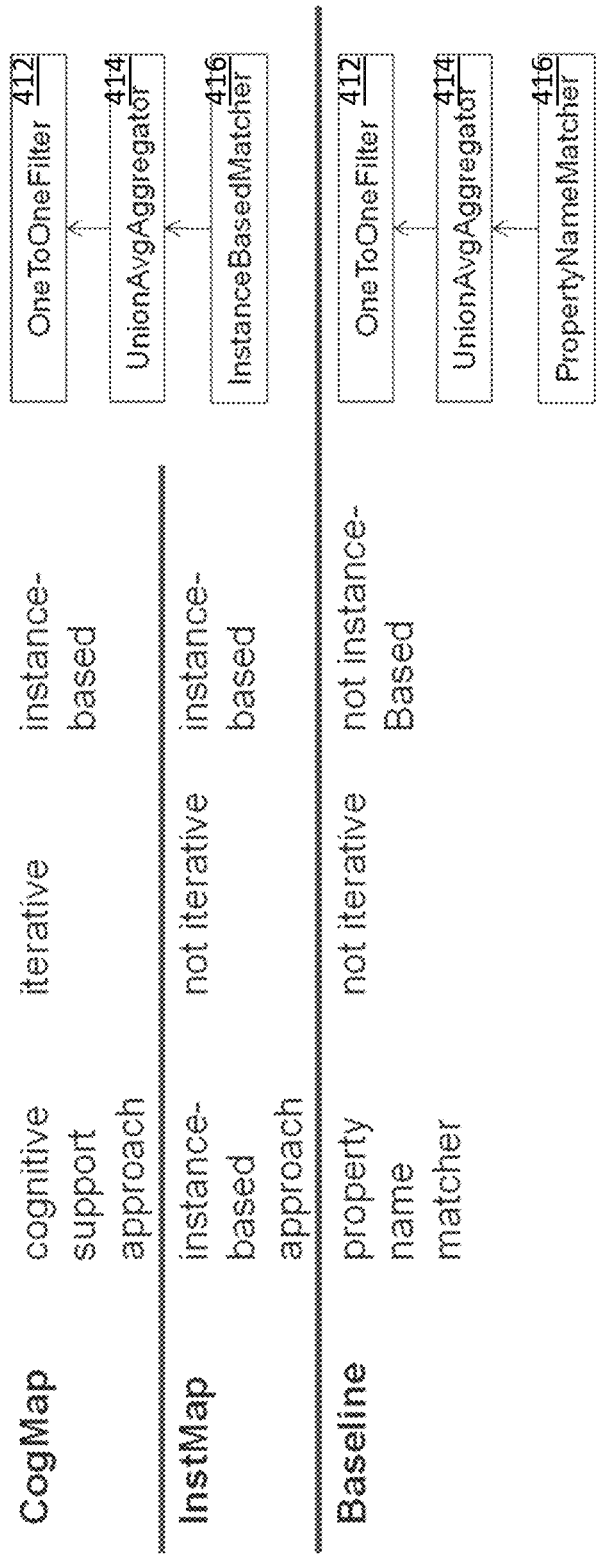
FIG. 33 is an illustration of a comparison between an alignment system and alternative alignment systems, in accordance with some embodiments.

The iterative approach described herein has been tested on real-world benchmarks, including, first, aligning people from DBPEDIA in FOAF format with cast information of all programs playing on TV in the U.S. over a two week window from a commercial Electronic Program Guide (EPG) database, and, second, aligning FREEBASE films with movie data from FANDANGO. FIG. 30 (at top) provides details on the number of instances and properties of each benchmark. The benchmarks were used to evaluate the impact of using an iterative approach and the impact of using instance data. FIG. 30 provides example trees for configurations (A) and (B) built from components 410 and a description of each component 410 used in configuration (A) can be found in FIG. 23.

To test aspects of the techniques described herein, a number of variants of an alignment system were utilized incorporating various aspects described herein. The tests were performed using automated techniques. A first variant of a system using techniques described herein, referred to as COGMAP, utilized both an iterative approach (e.g., the cognitive model) as well as instance data. A second variant, referred to as INSTMAP, utilized instance data but does not iterate on the results. A third variant, referred to as the Baseline, utilized neither iterations nor instance data and performed alignment using a property name matcher (see configuration (B) in FIG. 30). Moreover, three state-of-the-art ontology alignment systems were selected to compare to the COGMAP system utilizing at least some of the techniques described herein. The three systems are AML, LOGMAP, and RIMOM. AML is focused on computational efficiency and designed to handle very large ontologies. AML is the leading system in the conference and anatomy tracks of the 2014 ontology alignment evaluation, in terms of f-measure. LOGMAP provides a scalable logical ontology alignment framework. RIMOM automatically combines multiple alignment strategies with the goal of finding the optimal alignment results.

Each system mentioned above was applied to both Benchmarks 1 and 2. In these tests, unless otherwise noted, the number of instances to use from each benchmark was set to M=5000, and the fraction of non-null values required for each property was set to $\phi=0.1$. Experiments were run on a desktop PC with 4 GB of RAM and an Intel i5 duo-core processor, using FAST-JOIN as the underlying matching algorithm for instances. FAST-JOIN combines both token-based similarity (Jaccard, Cosine, or Dice) and string edit distance. Moreover, FAST-JOIN is currently the fastest matching algorithm, by implementing efficient pruning and hashing techniques, with soundness and completeness guarantees.

The output of each system was graded by a human judge, familiar with the data sources in each benchmark, using the metrics of Precision at n (P@n) and the normalized (logarithmic) Discounted Cumulative Gain at n (nDCG@n) where n denotes the top-n results (FIG. 31). Precision P is defined as:

$$P = \frac{|\text{correct correspondences}|}{|\text{retrieved correspondences}|}$$

and nDCG is defined as:

$$nDCG = \frac{rel_1 + \sum_{i=2}^{n} \frac{rel_s}{\log_2 i}}{\left(1 + \sum_{i=2}^{n} \frac{1}{\log_2 i}\right)}$$

where $rel_i$ is 1 if the alignment hypothesis at position i is correct and 0 else. nDCG@n gives more weight to correct alignment hypotheses that are ranked higher. FIG. 32 shows the results for benchmarks 1 and 2, respectively. From these results, COGMAP outperformed INSTMAP in most cases. In addition, INSTMAP outperformed Baseline in all cases. Thus, the use of instance data and the iterative approach has been shown to improve performance. Importantly, the variants using techniques described herein out-performed all three state-of-the-art ontology matching systems compared, i.e. AML, LOGMAP, and RIMOM. Thus, using instance data for alignment, using an iterative approach for alignment and/or ignoring rarely used properties by using the parameter, alone or in combination, can improve the performance in aligning data sources.

Figure 34:
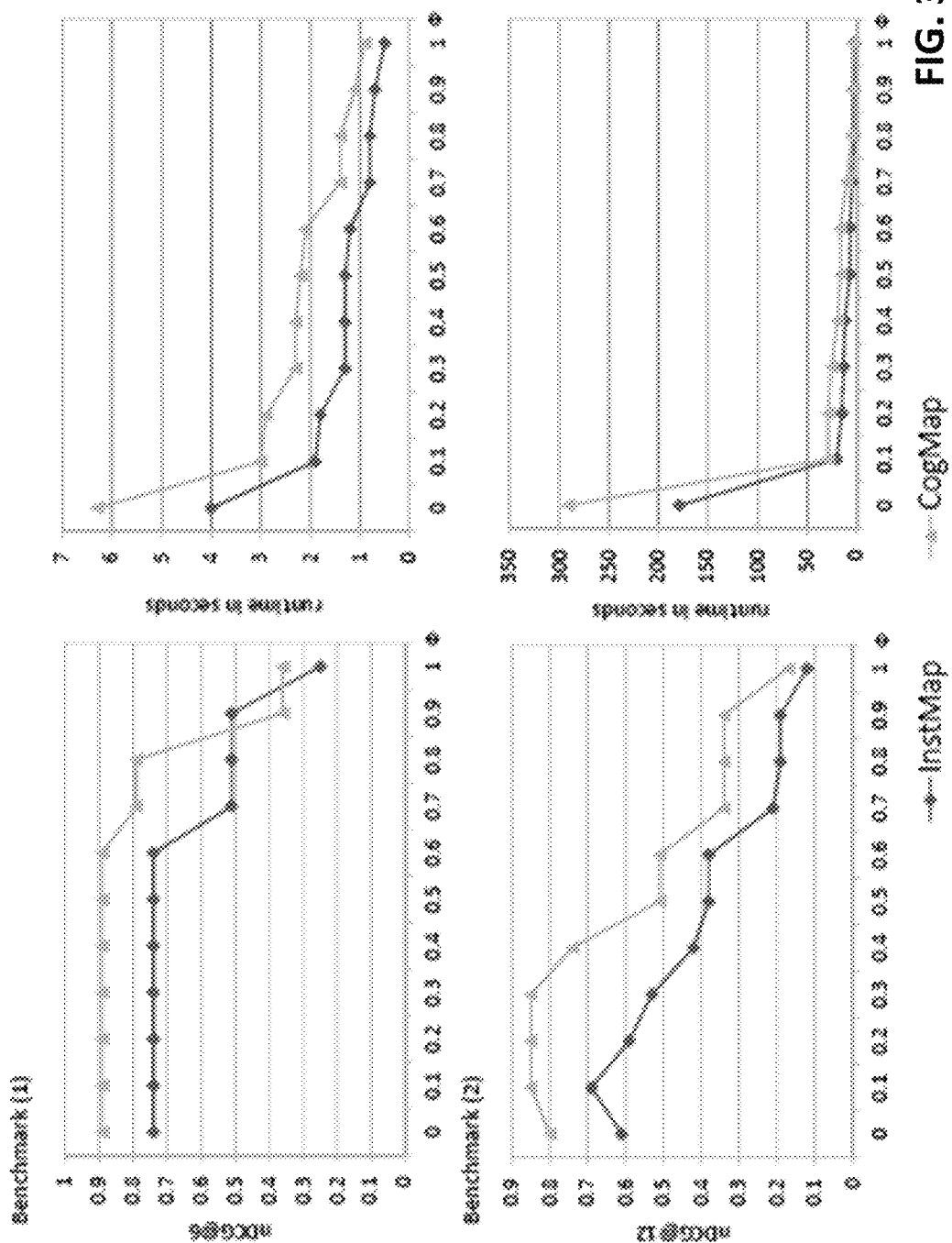
FIG. 34 is an illustration of additional results for benchmarks used to evaluate an alignment system, in accordance with some embodiments.
Figure 35:
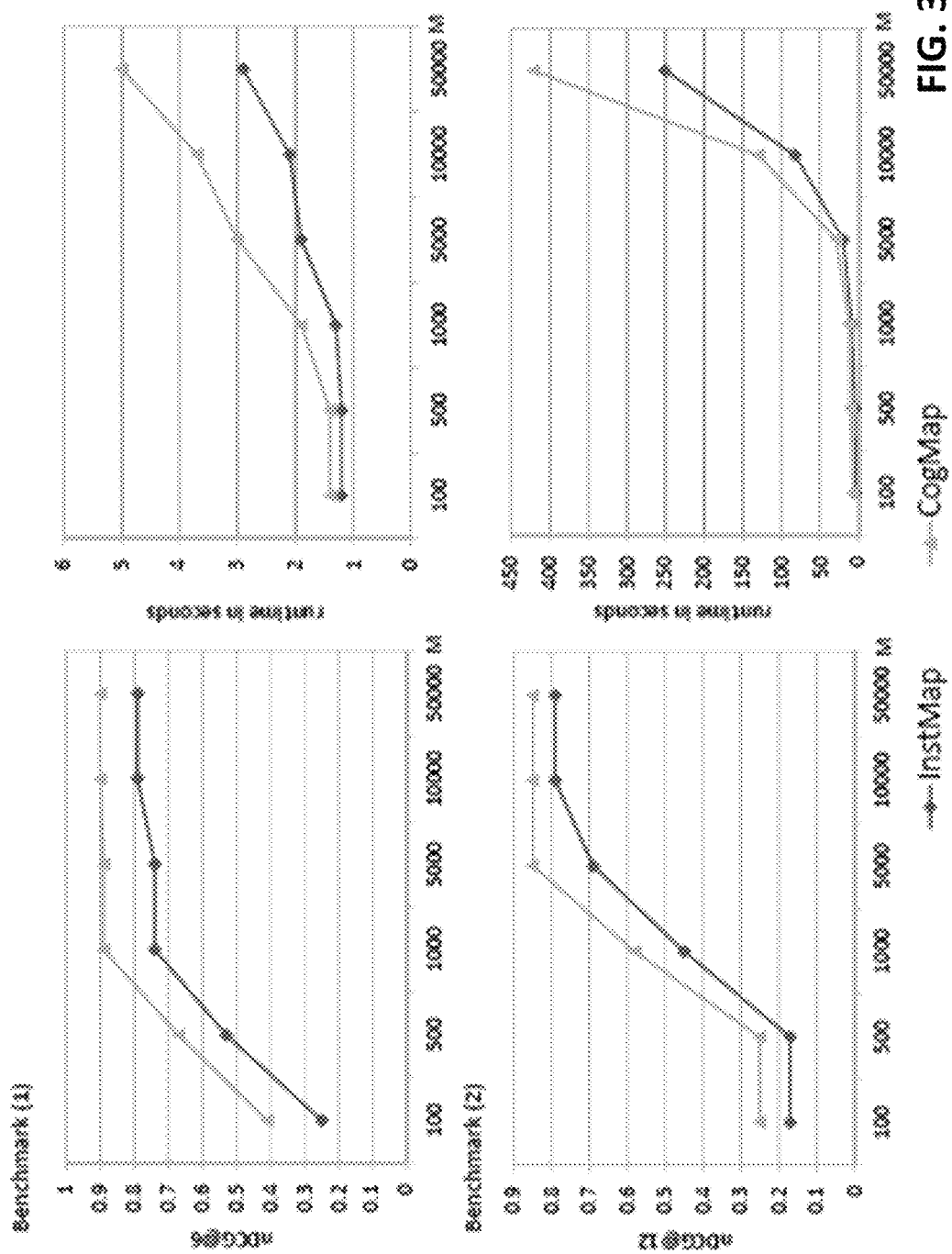
FIG. 35 is an illustration of additional results for benchmarks used to evaluate an alignment system, in accordance with some embodiments.

FIGS. 34 and 35 show the impact of varying $\phi$ (the fraction of non-null values required for each property) and M (the number of instances used) for the system described herein and for INSTMAP on both benchmarks. These results demonstrate the relative robustness of the system described herein to these parameter settings compared to INSTMAP, and further demonstrate the positive impact of using a cognitive support model. For example, the inventors have observed on both benchmarks that the performance of the system described herein only became negatively impacted for larger values of $\phi$, which was in contrast to INSTMAP. Similarly, the performance of the system described herein increased at a faster rate compared to INSTMAP as M was increased, and plateaued sooner than INSTMAP.

Figure 36:
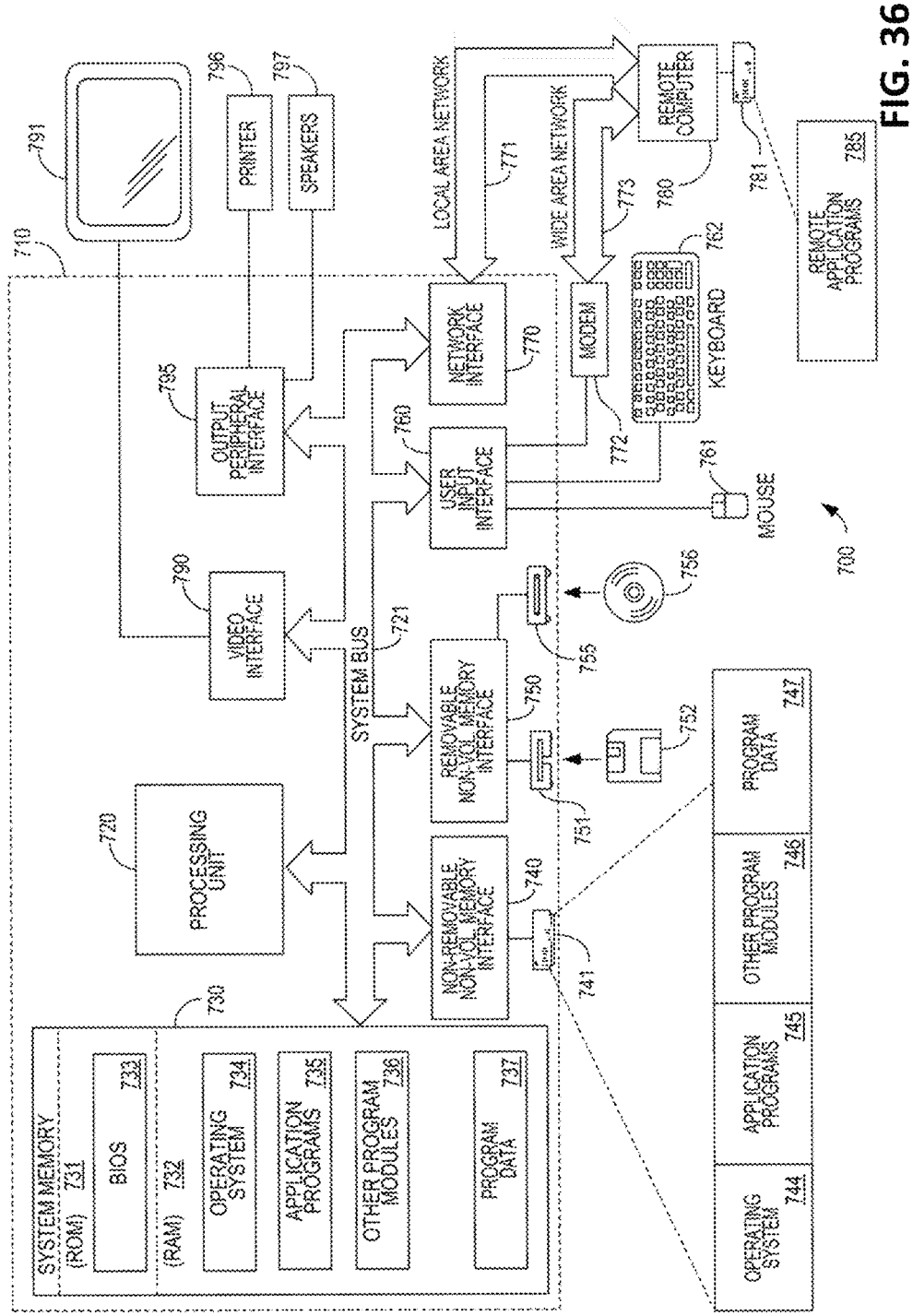
FIG. 36 is a block diagram of an exemplary computer system on which techniques described herein may be implemented, in accordance with some embodiments.

FIG. 36 illustrates an example of a suitable computing system environment 700 in which some embodiments may be implemented. This computing system may be representative of a computing system that allows a suitable computing system to implement the described techniques. However, it should be appreciated that the computing system environment 700 is only one example of a suitable computing environment and is not intended to suggest any limitation as to the scope of use or functionality of the described embodiments. Neither should the computing environment 700 be interpreted as having any dependency or requirement relating to any one or combination of components illustrated in the exemplary operating environment 700.

The embodiments are operational with numerous other general purpose or special purpose computing system environments or configurations. Examples of well-known computing systems, environments, and/or configurations that may be suitable for use with the described techniques include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc., that perform particular tasks or implement particular abstract data types. The embodiments may also be practiced in distributed computing environments where tasks are performed by remote processing devices that are linked through a communications network. In a distributed computing environment, program modules may be located in both local and remote computer storage media including memory storage devices.

With reference to FIG. 36, an exemplary system for implementing the described techniques includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 36 illustrates operating system 734, application programs 735, other program modules 736, and program data 737.

The computer 710 may also include other removable/non-removable, volatile/nonvolatile computer storage media. By way of example only, FIG. 36 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 36 provide storage of computer readable instructions, data structures, program modules and other data for the computer 710. In FIG. 36, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, touchscreen, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 36. The logical connections depicted in FIG. 36 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 36 illustrates remote application programs 785 as residing on memory device 781. It will be appreciated that the network connections shown are exemplary and other means of establishing a communications link between the computers may be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation comprises at least one processor-readable storage medium (i.e., at least one tangible, non-transitory processor-readable medium, e.g., a computer memory (e.g., hard drive, flash memory, processor working memory, etc.), a floppy disk, an optical disc, a magnetic tape, or other tangible, non-transitory processor-readable medium) encoded with a computer program (i.e., a plurality of instructions), which, when executed on one or more processors, performs at least some of the above-discussed functions, and possibly others. The processor-readable storage medium can be transportable such that the program stored thereon can be loaded onto any computer resource to implement functionality discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed functionality.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Processor-executable instructions may be in many forms, such as program modules, executed by one or more computers or other devices. Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which multiple examples have been provided. The acts performed as part of each process may be ordered in any suitable way. Accordingly, embodiments may be constructed in which acts are performed in an order different than illustrated, which may include performing some acts concurrently, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for aligning a first data source and a second data source during a plurality of iterations comprising a first iteration and a second iteration occurring after the first iteration, the system comprising:
at least one processor configured to perform:
during the first iteration:
generating at least one first property alignment hypothesis between at least one first property of the first data source and at least one second property of the second data source, wherein the at least one first property represents a category of information stored in the first data source, and wherein the at least one second property represents a category of information stored in the second data source;
generating a plurality of first instance alignment hypotheses between a first plurality of instances of the first data source and a second plurality of instances of the second data source, wherein each instance in the first plurality of instances represents a value of a property of the first data source, and wherein each instance in the second plurality of instances represents a value of a property of the second data source; and
verifying the at least one first property alignment hypothesis and/or at least one of the plurality of first instance alignment hypotheses, and
during the second iteration:
selecting at least one third property of the first data source and/or at least one fourth property of the second data source based at least in part on a result of the verifying of the first iteration, wherein selecting the at least one third property and/or the at least one fourth property comprises selecting the at least one third property and/or the at least one fourth property based on the at least one first property alignment hypothesis and/or the at least one of the plurality of first instance alignment hypotheses verified during the first iteration;
generating at least one second property alignment hypothesis between the at least one third property of the first data source and the at least one fourth property of the second data source;
selecting a third plurality of instances of the first data source and/or a fourth plurality of instances of the second data source based at least in part on the result of the verifying of the first iteration, wherein selecting the third plurality of instances and/or the fourth plurality of instances comprises selecting the third plurality of instances and/or the fourth plurality of instances based on the at least one first property alignment hypothesis and/or the at least one of the plurality of first instance alignment hypotheses verified during the first iteration; and
generating a plurality of second instance alignment hypotheses between the third plurality of instances of the first data source and the fourth plurality of instances of the second data source.

2. The system of claim 1, wherein the first plurality of instances include a plurality of instances of the at least one first property and wherein the second plurality of instances include a plurality of instances of the at least one second property.

3. The system of claim 1, further comprising, during the first iteration, rejecting the at least one first property alignment hypothesis and/or the at least one of the plurality of first instance alignment hypotheses, and wherein generating the at least one second property alignment hypothesis and/or generating the plurality of second instance alignment hypotheses during the second iteration is based, at least in part, on at least one first property alignment hypothesis and/or the at least one of the plurality of first instance alignment hypotheses rejected during the first iteration.

4. The system of claim 1, wherein the at least one first property alignment hypothesis comprises a plurality of first property alignment hypotheses, and wherein generating the at least one first property alignment hypothesis comprises ranking the plurality of first property alignment hypotheses based on a level of confidence for each respective first property alignment hypothesis, and providing the plurality of first property alignment hypotheses in order based on the ranking for verification.

5. The system of claim 1, wherein generating the plurality of first instance alignment hypotheses comprises ranking the plurality of first instance alignment hypotheses based on a level of confidence for each respective first instance alignment hypothesis, and providing the plurality of first instance alignment hypotheses in order based on the ranking for verification.

6. The system of claim 1, wherein the first data source is one of a relational database, a semi-structured data source, a tuple-based data source, an ontology-based data source, and an object oriented database, and wherein the second data source is one of a relational database, a semi-structured data source, a tuple-based data source, an ontology-based data source, and an object oriented database, and wherein the at least one processor is configured to operate on any combination of the first data source and the second data source.

7. The system of claim 1, wherein generating the at least one first property alignment hypothesis comprises determining whether a property comprises a sufficient number of instances to generate a corresponding first property alignment hypothesis.

8. The system of claim 1, wherein the at least one processor is further configured to obtain the at least one first property and the first plurality of instances from the first data source and the at least one second property and the second plurality of instances from the second data source based on at least one respective query to the respective first data source and second data source.

9. The system of claim 1, wherein the at least one processor is configured to present the at least one first property alignment hypothesis and the at least one of the plurality of first instance alignment hypotheses to a human user for verification and/or rejection.

10. The system of claim 1, wherein the at least one first property alignment hypothesis indicates that one of the at least one first property and one of the at least one second property may represent a same category of information and/or the at least one of the plurality of first instance alignment hypotheses indicates that one of the first plurality of instances and one of the second plurality of instances may represent a same value or entity.

11. The system of claim 1, wherein:
during the second iteration, generating the at least one second property alignment hypothesis and/or generating the plurality of second instance alignment hypotheses comprises generating at least one confidence value that is based, at least in part, on the at least one first property alignment hypothesis and/or the at least one of the plurality of first instance alignment hypotheses verified during the first iteration, and the at least one processor is further configured to perform, during the second iteration, verifying the at least one second property alignment hypothesis and/or the plurality of second instance alignment hypotheses based on comparing the at least one confidence value to a threshold.

12. A method for aligning a first data source and a second data source during a plurality of iterations comprising a first iteration and a second iteration occurring after the first iteration, the method comprising:

during the first iteration:

generating at least one first property alignment hypothesis between at least one first property of the first data source and at least one second property of the second data source, wherein the at least one first property represents a category of information stored in the first data source, and wherein the at least one second property represents a category of information stored in the second data source;

generating a plurality of first instance alignment hypotheses between a first plurality of instances of the first data source and a second plurality of instances of the second data source, wherein each instance in the first plurality of instances represents a value of a property of the first data source, and wherein each instance in the second plurality of instances represents a value of a property of the second data source; and verifying the at least one first property alignment hypothesis and/or at least one of the plurality of first instance alignment hypotheses, and during the second iteration:

selecting at least one third property of the first data source and/or at least one fourth property of the second data source based at least in part on a result of the verifying of the first iteration, wherein selecting the at least one third property and/or the at least one fourth property comprises selecting the at least one third property and/or the at least one fourth property based on the at least one first property alignment hypothesis and/or the at least one of the plurality of first instance alignment hypotheses verified during the first iteration;

generating at least one second property alignment hypothesis between the at least one third property of the first data source and the at least one fourth property of the second data source;

selecting a third plurality of instances of the first data source and/or a fourth plurality of instances of the second data source based at least in part on the result of the verifying of the first iteration, wherein selecting the third plurality of instances and/or the fourth plurality of instances comprises selecting the third plurality of instances and/or the fourth plurality of instances based on the at least one first property alignment hypothesis and/or the at least one of the plurality of first instance alignment hypotheses verified during the first iteration; and generating a plurality of second instance alignment hypotheses between the third plurality of instances of the first data source and a respective second the fourth plurality of instances of the second data source.

13. The method of claim 12, wherein the first plurality of instances include a plurality of instances of the at least one first property and wherein the second plurality of instances include a plurality of instances of the at least one second property.

14. The method of claim 12, further comprising, during the first iteration, rejecting the at least one first property alignment hypothesis and/or the at least one of the plurality of first instance alignment hypotheses, and wherein generating the at least one second property alignment hypothesis and/or generating the plurality of second instance alignment hypotheses during the second iteration is based, at least in part, on the at least one first property alignment hypothesis and/or the at least one of the plurality of first instance alignment hypotheses rejected during the first iteration.

15. The method of claim 12, wherein the at least one first property alignment hypothesis comprises a plurality of first property alignment hypotheses, and wherein generating the at least one first property alignment hypothesis comprises ranking the plurality of first property alignment hypotheses based on a level of confidence for each respective first property alignment hypothesis, and providing the plurality of first property alignment hypotheses in order based on the ranking for verification.

16. The method of claim 12, wherein generating the plurality of first instance alignment hypotheses comprises ranking the plurality of first instance alignment hypotheses based on a level of confidence for each respective first instance alignment hypothesis, and providing the plurality of first instance alignment hypotheses in order based on the ranking for verification.

17. The method of claim 12, wherein the first data source is one of a relational database, a semi-structured data source, a tuple-based data source, an ontology-based data source, and an object oriented database, and wherein the second data source is one of a relational database, a semi-structured data source, a tuple-based data source, an ontology-based data source, and an object oriented database, and wherein the method is configured to operate on any combination of the first data source and the second data source.

18. The method of claim 12, wherein generating the at least one first property alignment hypothesis comprises determining whether a property comprises a sufficient number of instances to generate a corresponding first property alignment hypothesis.

19. The method of claim 12, wherein further comprising obtaining the at least one first property and the first plurality of instances from the first data source and obtaining the at least one second property and the second plurality of instances from the second data source based on at least one respective query to the respective first data source and second data source.

20. The method of claim 12, further comprising presenting the at least one first property alignment hypothesis and the at least one of the plurality of first instance alignment hypotheses to a human user for verification and/or rejection.

\* \* \* \* \*